Nov. 7, 1967    R. M. McINDOE    3,351,169
CONTROL SYSTEM FOR HYDRAULICALLY ACTUATED FRICTION CLUTCHES
Filed April 12, 1965    8 Sheets-Sheet 1

INVENTOR.
RONALD M. McINDOE
BY Walter E. Parlich
David D. Hall
ATTORNEYS

INVENTOR.
RONALD M. McINDOE

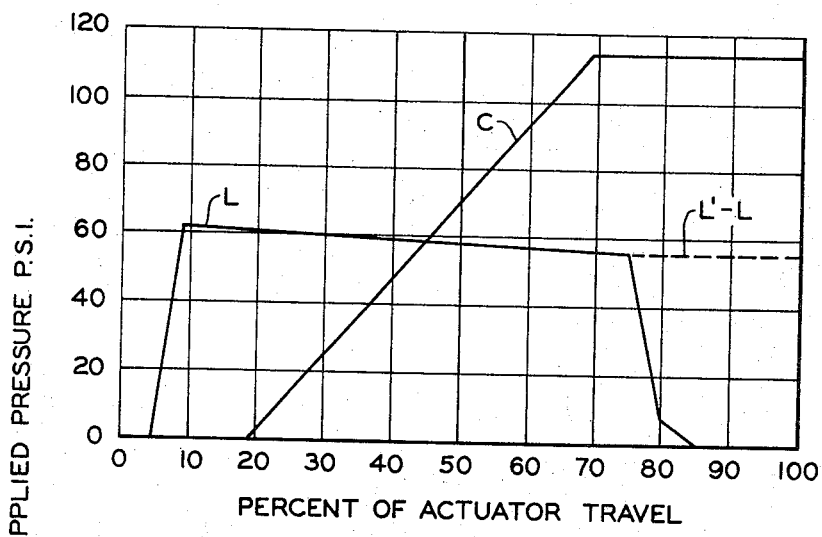
FIG. 4
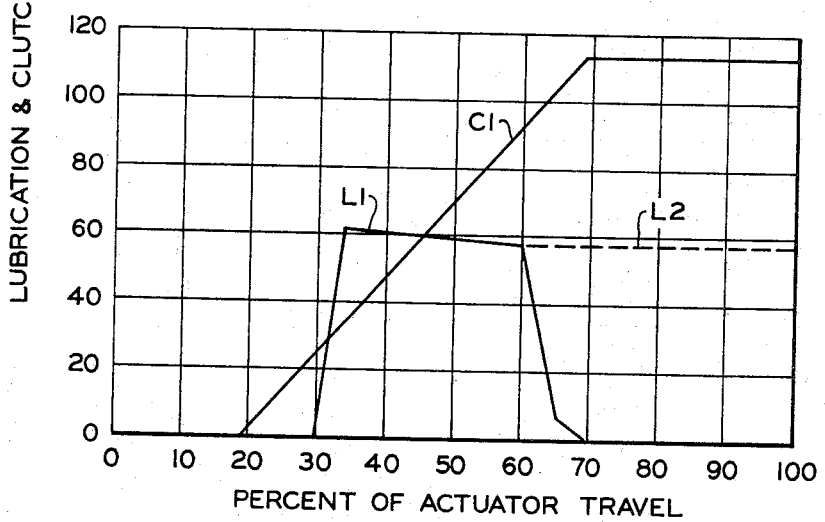
FIG. 8
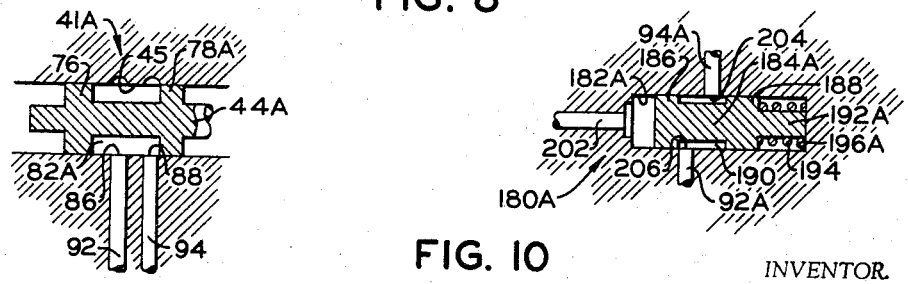
FIG. 9
FIG. 10

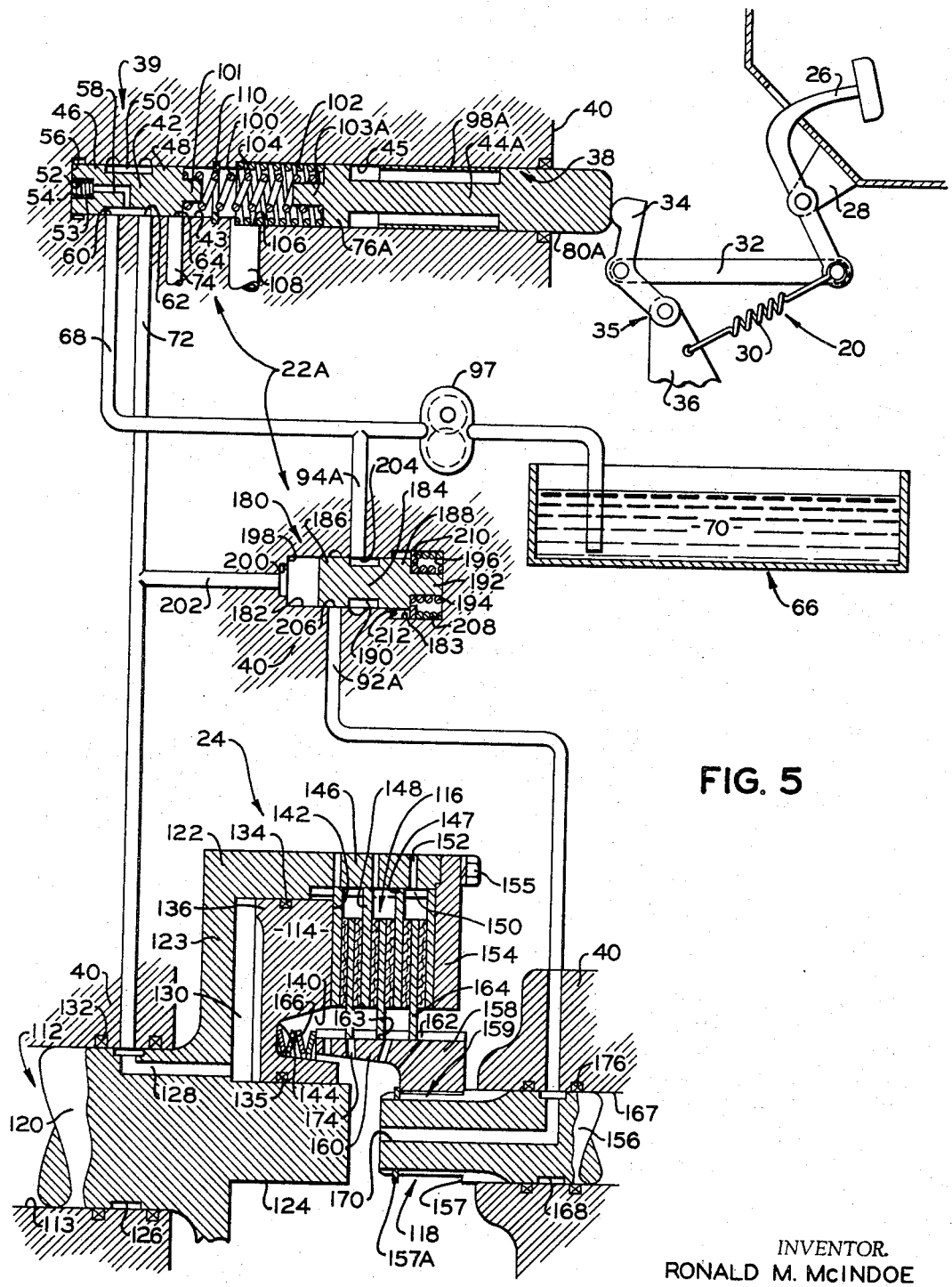

INVENTOR.
RONALD M. McINDOE

INVENTOR.
RONALD M. McINDOE

INVENTOR.
RONALD M. McINDOE

United States Patent Office 3,351,169
Patented Nov. 7, 1967

3,351,169
CONTROL SYSTEM FOR HYDRAULICALLY ACTUATED FRICTION CLUTCHES
Ronald M. McIndoe, Toledo, Ohio, assignor to Dana Corporation, Toledo, Ohio, a corporation of Virginia
Filed Apr. 12, 1965, Ser. No. 447,389
18 Claims. (Cl. 192—85)

ABSTRACT OF THE DISCLOSURE

A hydraulic control system for a friction type clutch having a first valve controlling engaging pressurized flow and a second valve controlling cooling pressurized flow, the valves being arranged so that cooling pressurized flow is insured to the friction disks of the clutch during partial engagement but not during disengagement of the clutch.

---

Figure 1:
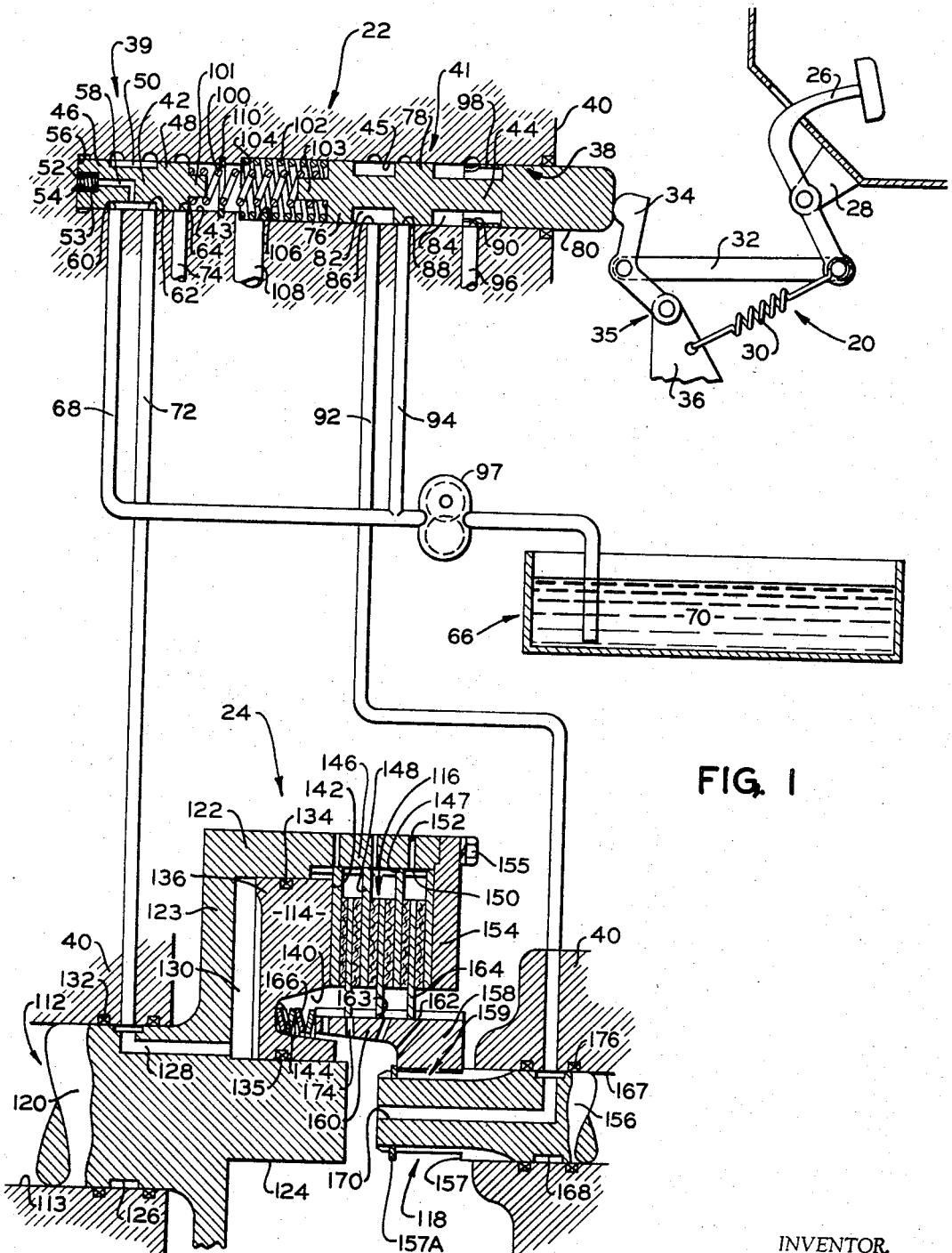

This invention relates to control systems for hydraulically actuated friction clutches and more particularly to control systems for hydraulic clutches of the friction type employing a fluid cooling system.

Hydraulically actuated friction clutches are widely used to drivingly connect a pair of relatively rotatable elements for unitary rotation and usually include a driving member and a driven member. In most applications it is necessary that the elements be brought to unitary rotation gradually, otherwise high torque would be applied instantaneously, resulting in high stresses on the elements as well as considerable discomfort to the operator thereof. This gradual engagement is accompanied by slipping and rubbing of the engaging portions of the driving and driven members for a short period from the time of initial contact until full engagement and unitary rotation is achieved. During such period of slip, the torque being transferred by the clutch gradually increases and the slip torque energy is dissipated in the form of heat at the rubbing clutch surfaces when the same are partially engaged. It is often desirable that such a clutch be provided with means for cooling and lubricating the friction surfaces, for the heat caused by the slipping thereof could create considerable damage thereto and lead to the destruction thereof, particularly in heavy vehicles such as trucks and tractors. To eliminate the damage which would be caused by such heat, lubricating and cooling fluid can be introduced between the friction surfaces of the clutch; such fluids usually being introduced near the radial centers of the friction members, after which the fluid flows radially outwardly across the friction surfaces due to centrifugal force acting on the fluid as the same is rotated by the clutch. Unfortunately, the cooling and lubricating fluid creates a viscous drag on the various clutch elements, which drag effects the transfer of torque therebetween and leads to difficulty in shifting the gears of the associated transmission, whether the same is synchronized or unsynchronized, when such a dragging clutch is disengaged.

It is, therefore, an object of this invention to provide means for supplying lubricating and cooling fluid for the clutch surfaces of a hydraulically actuated friction clutch during partial engagement of the same which means eliminates the presence of such fluid when the clutch is disengaged.

It is another object of this invention to provide a simple control system for actuating hydraulic clutch means.

It is another object of this invention to provide a control system for a hydraulic clutch wherein the engaging load applied to the clutch surfaces is manually controllable and cooling fluid is supplied to the engaging surfaces thereof while the clutch is being engaged and is discontinued when the clutch is disengaged.

It is yet another object of this invention to provide a control system as described immediately above wherein the supply of cooling fluid to the engaging surfaces is also discontinued when the clutch is engaged.

It is another object of this invention to provide a hydraulic control system which controls the supply of hydraulic fluid to a clutch assembly for causing the engagement thereof and cooling fluid to the engaging surfaces, wherein the hydraulic fluid and the cooling fluid supply have a controlled relationship.

Other and further objects of this invention will be apparent from the following description and claims, and may be understood by reference to the accompanying drawings wherein like numerals are employed to designate like parts throughout the same.

Figure 2:
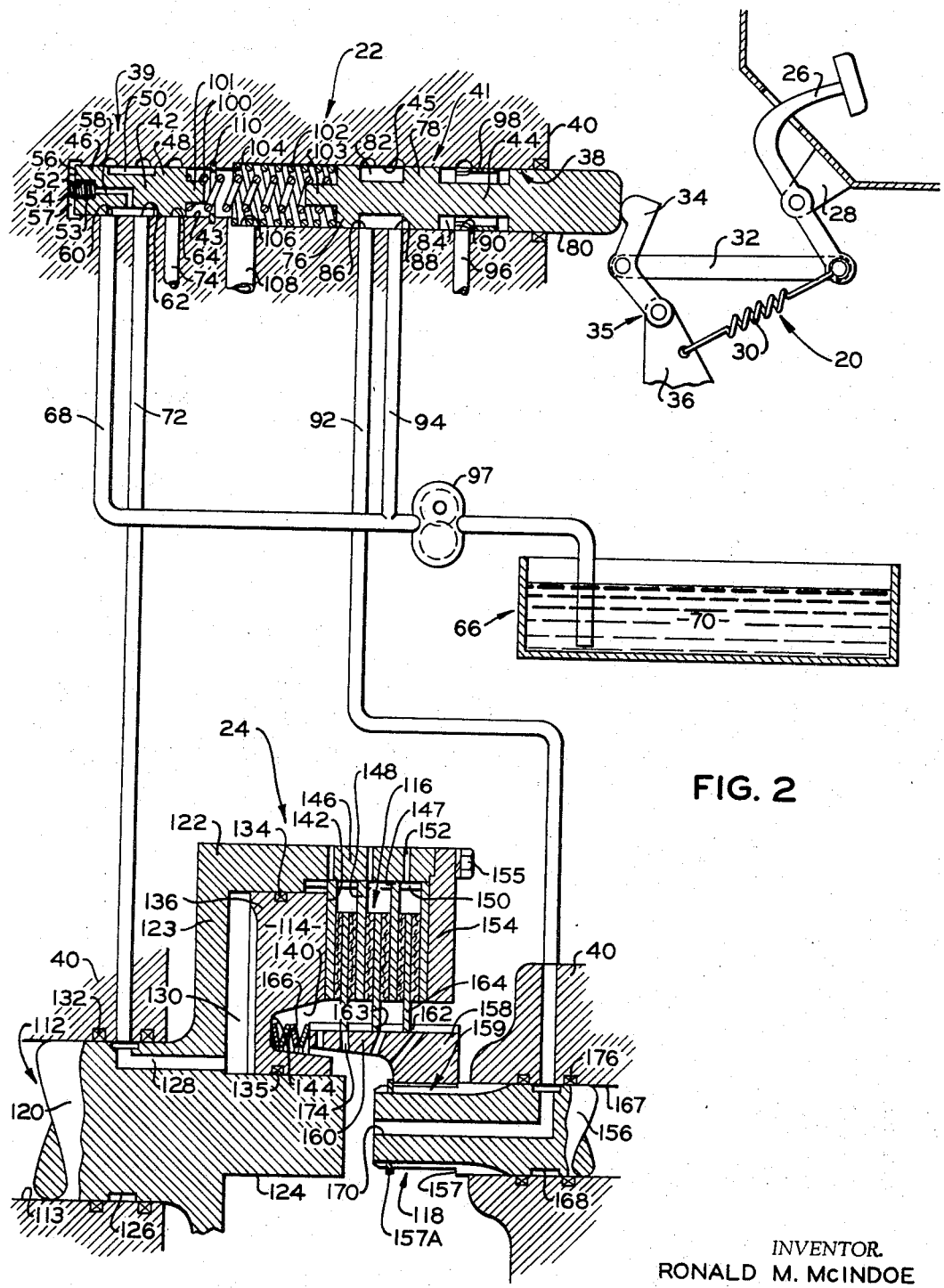
Figure 3:
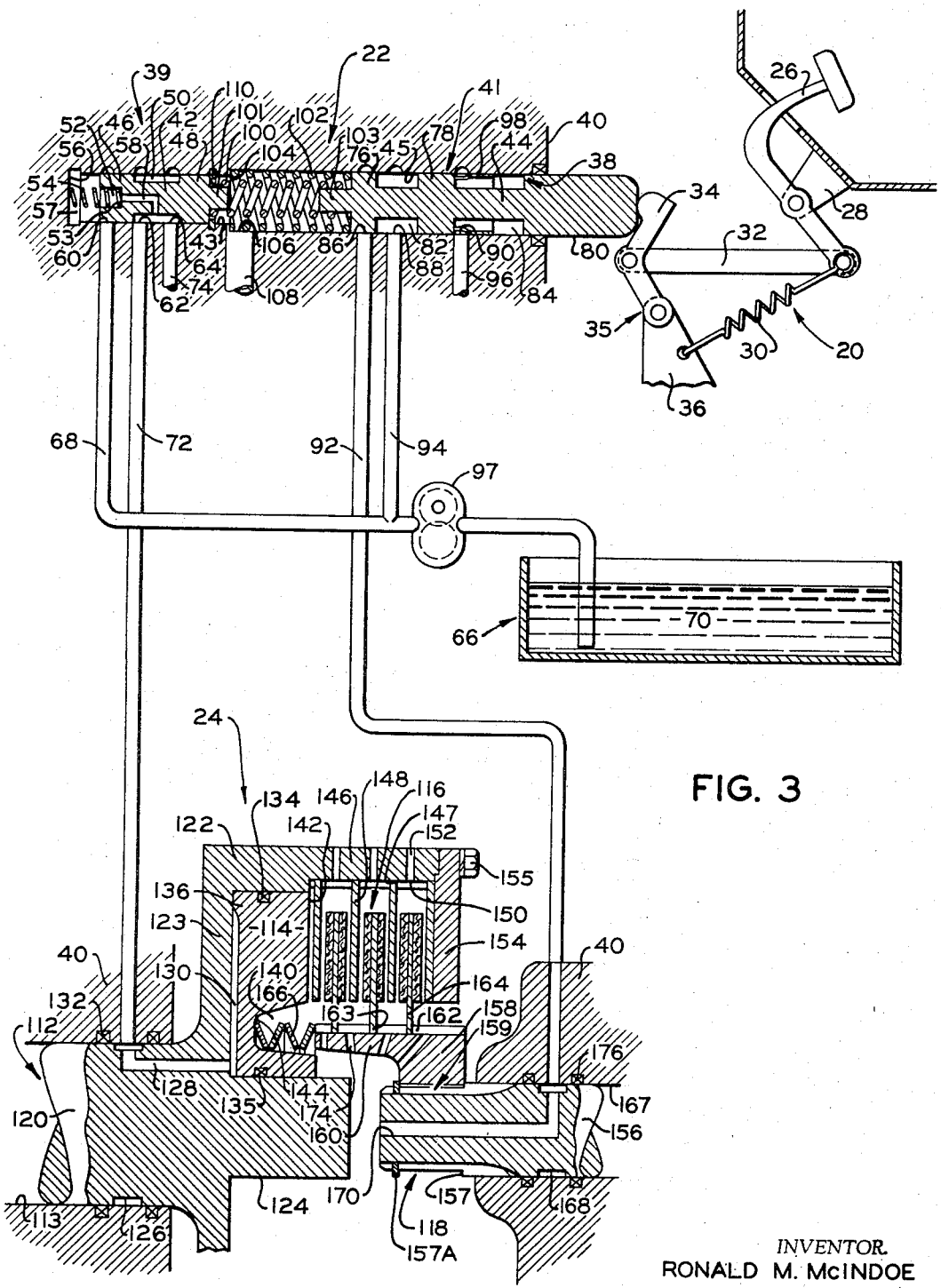
Figure 6:
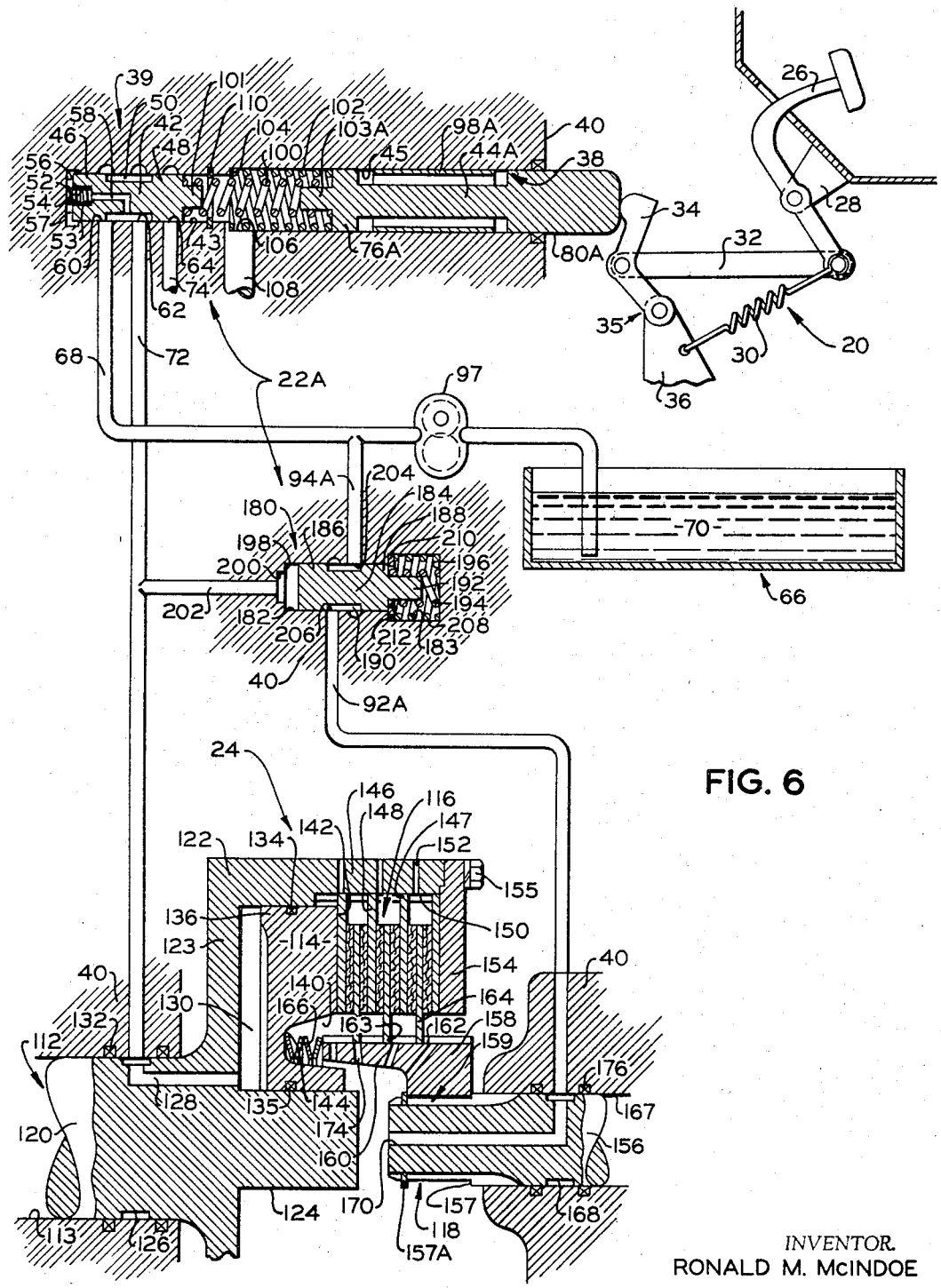
Figure 7:
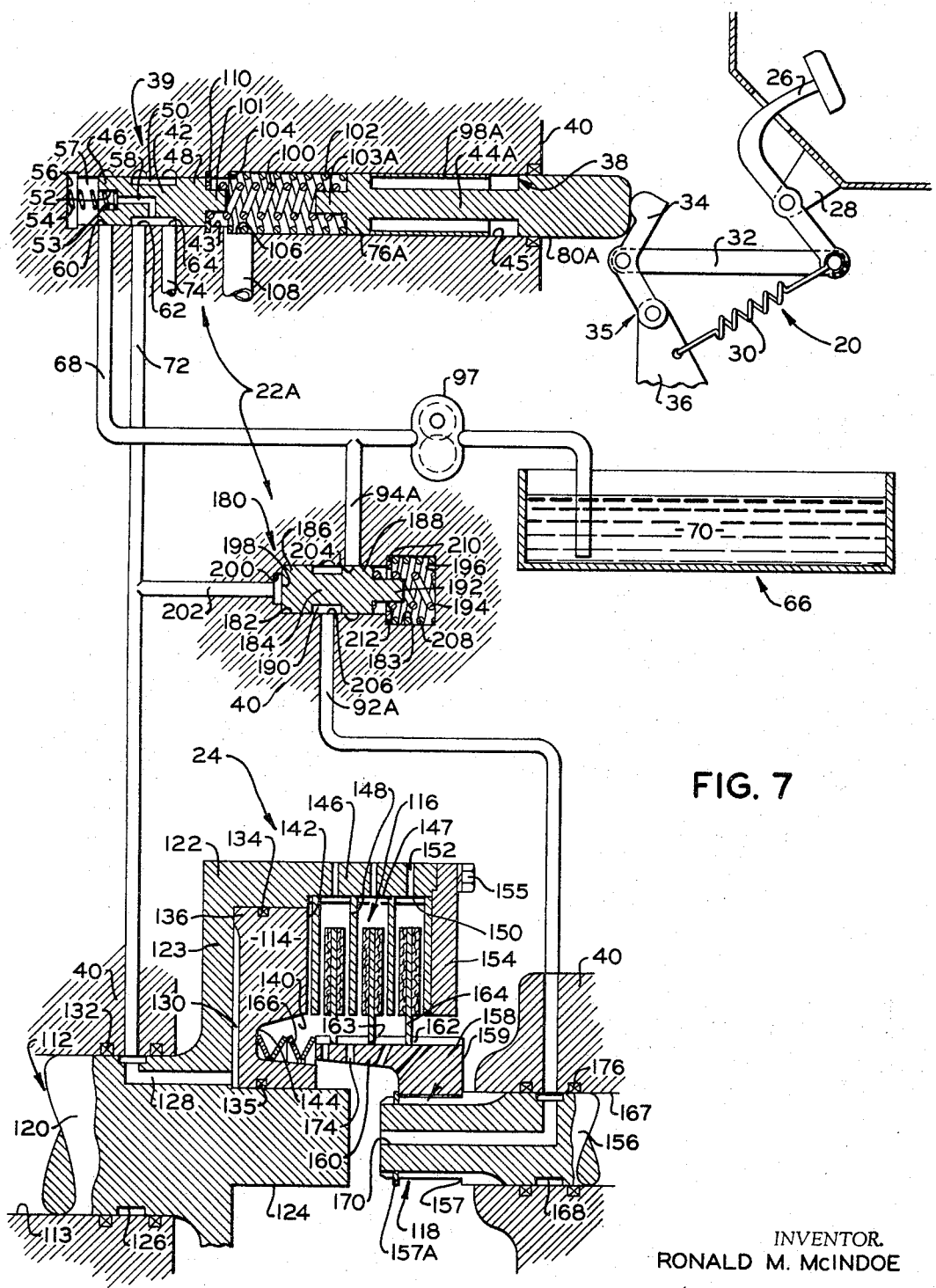
Figure 11:
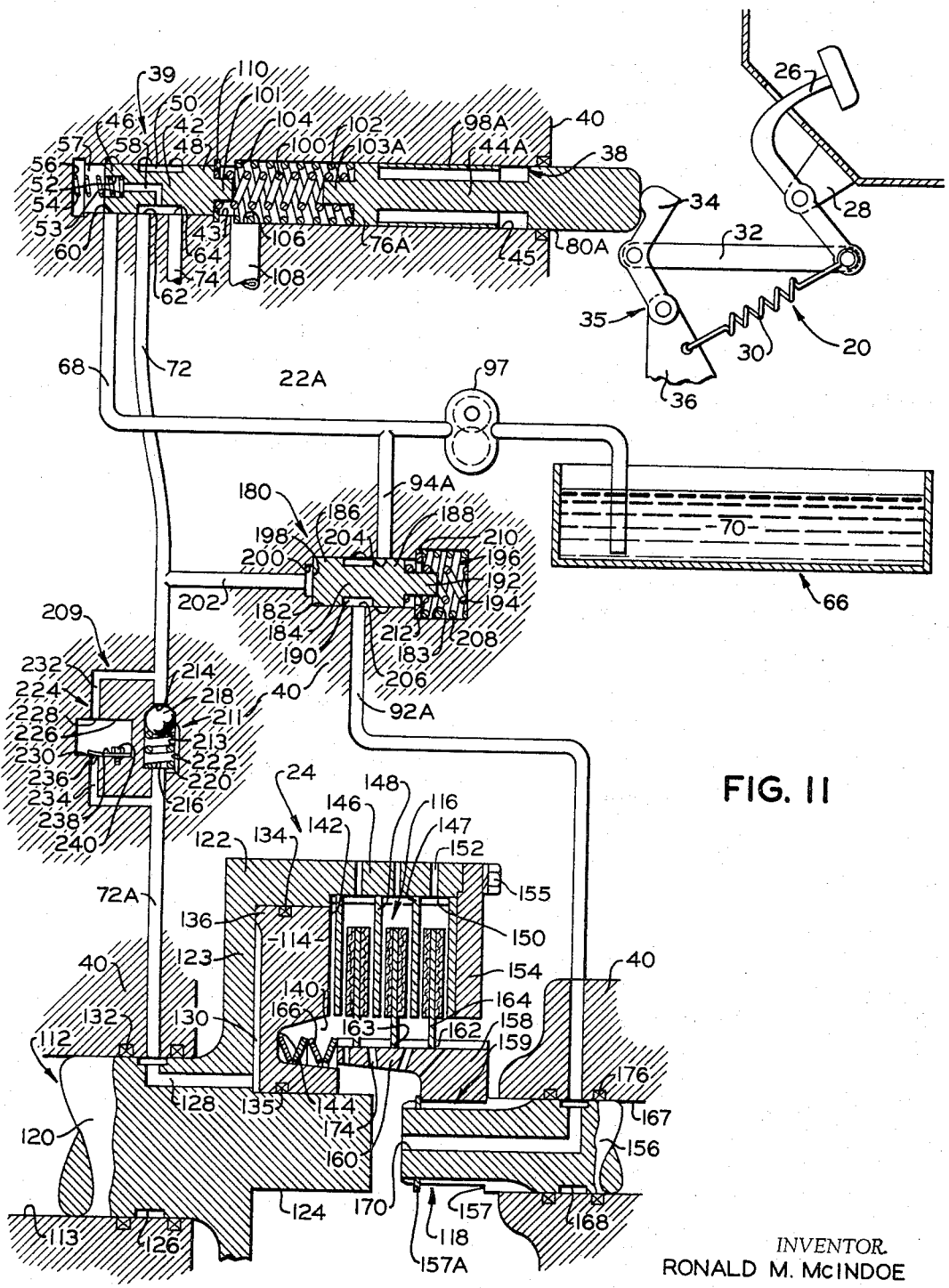

In the drawings:

FIGS. 1–3 are views of one embodiment, shown partially schematic and partially in longitudinal cross-section, of a hydraulically actuated clutch structure and a manually actuated hydraulic control system therefor, FIGS. 1, 2 and 3 showing the clutch and the control system in the fully engaged position, a position intermediate the fully engaged and disengaged positions, and fully disengaged position respectively;

FIG. 4 graphically shows the variation in the lubrication pressure and the hydraulic fluid pressure applied to the clutch as the control system is actuated;

FIGS. 5–7 are views, shown partially schematic and partially in longitudinal cross-section, of another hydraulically actuated clutch structure and hydraulic control system embodying this invention, FIGS. 5, 6 and 7 showing this clutch and the control system therefor in the fully engaged position, a position intermediate the fully engaged and disengaged positions, and fully disengaged position respectively;

FIG. 8 graphically shows the variation in the lubrication pressure and the hydraulic pressure applied to the clutch as the control system of FIGS. 5–7 is actuated;

FIGS. 9 and 10 show minor modifications in the embodiments of FIGS. 1–3 and FIGS. 5–7 respectively; and FIG. 11 is a view of another embodiment of this invention shown partially schematic and partially in longitudinal cross-section.

In one embodiment of this invention, a manual clutch pedal is connected through proper linkage to valve means of a hydraulically actuated friction clutch control system which controls the supply of engaging fluid to the means for engaging such clutch as well as the supply of cooling fluid to the friction surfaces of the same. The frictionally engaging portions of the clutch comprise two sets of coaxial disks, the disks of each set being interleaved with one another on an individual basis. One set of such disks is drivingly connected to a driving member for unitary rotation therewith, and the second set is drivingly connected to a driven member for unitary rotation therewith. A pressure plate in the form of a piston is disposed coaxially with and when disengaged is spaced relative to the clutch disks and is adapted to move to an engaged position to cause the friction disks to engage. A return means is provided to maintain the pressure plate in its disengaged position and spaced from the clutch disks. When sufficient hydraulic force is supplied to the pressure plate, the same moves toward engagement by overcoming the return means and urges the disks into engagement.

The control system comprises a valve means having a first portion in the form of a pressure regulator valve which modulates the pressure of and controls the flow of engaging fluid and a second portion which controls the flow of cooling fluid. Since the pressure of the engaging fluid can be modulated, an operator can obtain the degree of clutch engagement desired. Conduit means connect the first portion with the piston type pressure plate and the second portion with the surfaces of the clutch disks.

In one modification of this embodiment, when the clutch pedal is in the released or clutch engaging position, the engaging fluid portion of the valve is open to allow fluid to be pumped from a sump through such valve to the pressure plate so that sufficient force is applied to overcome the resilient means and fully engage the clutch disks. At this time, the cooling fluid portion of the valve is closed. As the clutch pedal is depressed, the first portion of the valve modulates the fluid pressure's action on the pressure plate in proportion to the amount of pedal depression so as to reduce the hydraulic load on the pressure plate while the second portion of the valve commences to open and becomes fully opened when the manual pedal is partially depressed and before the clutch disks commence slipping, and, after the disks become substantially disengaged, the second portion commences to close. Consequently, the force applied to the pressure plate decreases as the clutch pedal is depressed and cooling fluid is supplied to the friction disk surfaces. The fluid is supplied from the second portion of the valve to the friction disk preferably at the radial centers of the same from whence it is driven across the friction surfaces thereof by centrifugal force and eventually through vents leading to the sump. By having the fluid pass through vents leading to the sump, it is quickly removed from the clutch disk surfaces after having cooled and lubricated the same and when the fluid supply is discontinued, so is the development of viscous drag.

As stated above, the system is so designed that when the clutch pedal is partially depressed the first portion of the valve which controls the engaging fluid has caused the hydraulic load on the pressure plate to be reduced and the second portion of the valve controlling cooling fluid is fully opened. At this time, the clutch disks are not subjected to full engagement pressure from the pressure plate and will tend to slip under torsional load and would, but for the presence of the cooling fluid, tend to heat excessively as a result of such slipping. When the clutch pedal is fully depressed both portions of the valve are completely closed, resulting in the clutch disks being completely disengaged through the unopposed action of the return means, the cooling fluid supply being completely discontinued and the fluid in the vicinity of the disks being removed by the vent as heretofore explained. After the gears of the associated transmission have been shifted, the clutch pedal is released and the above procedure is repeated, but in reverse order.

In the modification of the first embodiment, the second portion of the valve continues to direct cooling fluid to the valve even when the disks are completely engaged; such being beneficial in applications where substantial slipping of the disks is expected and the cooling thereof desired to continue after full engagement.

In a second embodiment of this invention, the control system hydraulically regulates the lubricating fluid supply to a multiple disk clutch assembly. A first modification of this second embodiment comprises a manual clutch pedal assembly which actuates a primary pressure regulator valve. This primary valve receives fluid from a sump and controls the supply of and modulates the pressure of the same passing to and causing engaging movement of the piston type pressure plate of a clutch assembly. A hydraulic pressure actuated valve for controlling cooling fluid communicates with the pump and controls the supply of cooling fluid therefrom to the friction surfaces of the clutch assembly and is controlled by the pressure of the fluid passing through the primary valve to the clutch assembly. This cooling fluid valve opens and closes in response to the pressure of the clutch engaging fluid.

When the clutch pedal is in the released or clutch engaged position, the primary valve is fully open and the hydraulic pressure applied to the pressure plate is at a maximum; the coolant control valve when subjected to full engaging fluid pressure is closed, with the result that full engaging load is supplied to the pressure plate to engage the clutch but no cooling fluid is supplied thereto.

As the clutch pedal is depressed, the primary valve reduces the pressure of the clutch engaging fluid and as the hydraulic load on the pressure plates decreases, the clutch disks enter a period of slip. With such decrease in hydraulic pressure the coolant valve begins to open so that fluid is supplied onto the surfaces of the friction disks. By the time the pedal is partially depressed, the primary valve will have caused a reduction of hydraulic load and the lubricating valve is fully opened. As the clutch pedal is fully depressed, the primary valve causes complete removal of the hydraulic load to the pressure plate, and the secondary valve also closes in the absence of the engaging fluid pressure to cut off the flow of cooling fluid to the clutch assembly. When both valves in the circuit are thus closed, the clutch is disengaged and no coolant flows to the clutch disks where, if present, it would cause a viscous drag. With the release of the manual pedal, the engaging operation occurs in the reverse order as described for the disengaging operation.

Consequently, this embodiment provides a manually controlled fully hydraulic means for engaging and disengaging a friction clutch and for supplying cooling fluid to the engaging surfaces throughout the periods of slipping thereof, both when engaging and disengaging the clutch. In a second modification of this embodiment, the cooling valve remains open when the clutch is fully engaged, resulting in benefits discussed above regarding the first embodiment.

In another embodimnet of this invention, the second embodiment described above is provided with a pressure build-up valve between the clutch and the primary valve so that the pressure therebetween builds up to a level sufficient to open the secondary valve and direct cooling fluid to the clutch before the pressure build-up valve opens and passes engaging fluid to the clutch.

Referring now to FIGS. 1–3, a clutch pedal mechanism is shown generally at 20, a hydraulic control valve is shown generally at 22, and a multiple disk clutch assembly is shown generally at 24. The clutch pedal mechanism 20 has a clutch pedal lever 26 which is suitably pivotally connected at a location intermediate its ends to a first fixed member 28. The pedal lever 26 is adapted to rotate counterclockwise from its upper or engaged position shown in FIG. 1 when its upper end is depressed; for convenience, the position of the lever 26 as shown in FIG. 1 and the position of the various parts cooperating therewith are referred to as being in the engaged position and, upon rotation of the lever 26 counterclockwise to its depressed position as shown in FIG. 3, the lever and the various parts cooperating therewith are referred to as being in their disengaged position. Pivotally connected to the lower end of the pedal lever 26 is one end of a return tension spring 30 and the right end of a linkage member 32. The other end of the tension spring 30 is connected to a second fixed member 36 and the spring is slightly preloaded when the lever is in its upper position and becomes more greatly loaded as the lever is depressed so that it tends to rotate the lever 26 in a clockwise direction. The left end of the linkage member 32 is suitably pivotally connected to a second or regulator lever 34 at a position intermediate the ends of the latter.

The bottom end of the second lever 34 is pivotally connected in a suitable manner as shown generally at 35 to the second fixed member 36 while the top end of lever 34 operatively engages a portion of the control valve 22.

The valve 22 includes a hydraulic fluid control and pressure modulating portion 39 and a cooling fluid control portion 41. More particularly, a stationary housing or case 40 is provided with a bore means 38 having a closed inner end and being formed from axially aligned bores 43 and 45; the bore 43 being on the left and of smaller diameter than the bore 45 and both of the bores being defined by cylindrical walls in the housing 40.

The first valve portion 39 includes an axially movable valve stem 42 having spaced lands 46 and 48 of equal diameter which sealingly and slidingly engage the wall of the bore 43. A movable annular chamber 50 is defined by the wall of the bore 43 and the portion of stem 42 intermediate the lands 46 and 48. The valve stem 42 has a bore 52 formed therein and extending axially inwardly from its left or outer end; the bore 52 terminating in an annular shoulder 53. A compression 54 is disposed within bore 52 and abuts the annular shoulder 53 thereof and extends from the left end of the stem 42 into abutting engagement with the closed inner end 56 of the bore means 38. A variable sized chamber 57, see FIG. 3, is defined by bore 52 and any clearance between the left end of the stem 42 and the closed end 56 of bore means 38 and the wall of the bore 43 surrounding such clearance.

The chamber 50 communicates with the chamber 57 by means of an L-shaped passage 58 formed in the valve stem 42 and having continuous axially and radially extending portions; the axially extending portion being confluent with and of smaller diameter than the bore 52 so that the shoulder 53 is defined therebetween, and the radially extending portion having an opening in the stem 42 between the lands 46 and 48.

Confluent with the bore 43 are a plurality of openings 60, 62, and 64. The leftward opening 60 communicates through a conduit or source of fluid pressure 68 with a sump 66; the latter serving as a reservoir for the fluid 70 of the hydraulic system. The middle opening 62 communicates with the clutch assembly 24 through a conduit 72, and the rightward opening 64, which functions as a vent, communicates with the sump through vent conduit 74. For ease of understanding, the conduits 68 and 72 can be considered as a conduit means for conducting fluid pressure from the sump 66 to the clutch assembly 24 and having the first valve portion 39 interposed therein.

The second valve portion 41 comprises an axially movable valve stem 44 having a plurality of spaced lands 76, 78 and 80 of equal diameter which slidingly and sealingly engage the wall of the bore 45. A movable chamber 82 is defined by that portion of stem 44 intermediate the left land 76 and the middle land 78 and surrounded by the wall of bore 45, and another movable chamber 84 is defined by that portion of the stem 44 between the middle land 78 and the right land 80 and surrounded by the wall of bore 45. The right land 80 of stem 44 extends beyond the case 40 and the top end of lever 34 abutting engages the right end thereof.

A plurality of openings 86, 88 and 90 are confluent with the bore 45; the leftward opening 86 communicating with the clutch assembly 24 through a conduit 92, the middle opening 88 communicating with the conduit 68 through a conduit 94, and the rightward opening 90 communicating with the sump 66 through a conduit 96. The chamber 84 and opening 90 are provided to vent to the sump 66 any fluid which may leak past the land 78. For ease of understanding, the conduits 92 and 94 can be considered as a conduit means for conducting fluid pressure from the sump to the clutch assembly 24 and having the second valve portion 41 interposed therein. Interposed in the conduit 68 intermediate the conduit 94 and the sump 66 is a pump 97, preferably of the constant pressure type, which provides a supply of pressurized hydraulic fluid to the control valve 22 through the lines 68 and 94.

Within the chamber 84 and stationarily attached to the side wall of the bore 45 is an axially elongated ring 98 having a radially inwardly displaced portion thereof extending over the opening 90 and serving as a stop means for abutting the land 78 and limiting axial movement of stem 44 to the right, as shown in FIG. 3, while allowing the opening 90 to remain open to vent any hydraulic fluid which may leak past the land 78 while the same is abutting the ring. The right side of the ring 98 is adapted as a stop means for abutting the left side of land 80 thereby limiting axial movement of the stem 44 to the left.

Disposed intermediate valve stems 42 and 44 are a pair of coaxial coiled compression springs 100 and 102. The compression spring 100 has an outside diameter smaller than the inside diameter of the spring 102 and is received within the central opening in and freely movable relative to the spring 102. The opening in the left end of spring 100 pilotingly receives a reduced portion 101 formed on the right end of stem 42, while the left outer end of the spring abuts the right side of the land 48. The opening the right end of spring 100 pilotingly receives a reduced portion 103 formed on the left end of stem 44, while the right outer end of the spring abuts the left end of land 76. The reduced portions 101 and 103 received in the openings in the spring 100 maintain the latter from shifting radially into engagement with the spring 102. The left end of spring 102 abuts an annular shoulder 104 formed by the housing 40 at the junction of the bores 43 and 45, and the right end thereof abuts the left end of land 76. Thus, the spring 100 serves as a resilient compressable spacer between the valve stems 42 and 44 and when compressed biases the stems axially apart, while the spring 102 biases the valve stem 44 axially to the right.

A venting opening 106, communicating with the sump 66 through a conduit 108, is provided in the bore 45 at the left end thereof and intermediate the valve stems 42 and 44 for the purpose of relieving any pressure which may be created by relative axial movement of the stems 42 and 44 and to vent any hydraulic fluid which may leak into this area past lands 48 or 76, thereby assuring free movement of the stems. Adjacent and to the left of opening 106 is an annular snap ring 110 secured in a groove in the wall of the bore 43 which limits the axial movement to the right of stem 42 by engaging the right side of land 48 as shown in FIG. 3.

The multiple-disk clutch assembly 24 is adapted to drivingly connect a pair of members for unitary rotation, said members being referred to for convenience as a driving member 112 and a driven member 118, and includes a piston type pressure plate 114 carried by said driving member for relative axial movement and a plurality of engageable friction means shown generally at 116, some of which are carried by the driving member and some by the driven member, adapted to be pressed into frictional engagement by the pressure plate 114.

More particularly, the driving member 112 includes a shaft 120 rotatably carried in an opening 113 in the housing 40, which shaft has an annular portion or cylinder 122 secured thereto for unitary rotation by a radially extending flange portion 123 integrally connected to the cylinder and the shaft. The portion of the shaft 120 to the right of flange 123, indicated at 124, is of a reduced diameter and slidably receives thereon the pressure plate 114. A peripheral groove 126 extends circumferentially about the shaft 120 in radial alignment with a portion of the conduit 72 which is formed in the housing 40 and intersects the opening 113, and an L shaped passage 128, formed in the shaft 120, communicates with the groove 126 and extends to the right therefrom to open at the base of the flange 123 and communicate with a chamber 130 defined by the internal surface of the cylinder 122, the periphery of the reduced portion 124, the internal surface of the flange 123 and the left face of the pressure plate 114. Peripheral sealing means 132 is provided in the surface of the opening 113 in the housing 40 on each axial side of the conduit 72 therein and sealingly engages the housing and the surface of the shaft 120 to prevent leakage of fluids passing from the conduit 72 to the groove 126.

The pressure plate 114 (only the upper half being shown) is peripherally received in the cylinder 122 and adapted for axial sliding movement relative thereto, and a slidable sealing means shown generally at 134 is received in a groove in the periphery of the pressure plate and sealingly engages the same and the cylinder, while a slidable sealing means 135 is receive in a groove in the bore of the pressure plate and sealingly engages the same and the reduced portion 124 of the shaft 120; which sealing means 134 and 135 cooperate to prevent the escape of fluid from the chamber 130, particularly when hydraulic pressure builds up in the same. The pressure plate 114 has an annular shoulder 136 extending from the left face thereof adjacent its periphery, which shoulder is adapted to engage the right side of the flange 123 to insure the existence of the chamber 130 regardless of the axial position of the pressure plate. An annular depression 140 is provided in the right face of the pressure plate 114 radially inwardly from the engaging face 142 thereof, which depression has a closed inner end formed by a vertical surface 144.

The right portion 146 of the cylinder 122 is provided with a plurality of axially extending circumferentially spaced internal splines 150 which cooperatively receives a plurality of external splines 147 formed on each of a plurality of axially spaced friction disks 148 so that the disks rotate unitarily with while being axially movable relative to the cylinder. A plurality of radially extending, circumferentially and axially spaced vents 152 are located within the portion 146 of the cylinder 122 and are connected by suitable gathering and conducting means (not shown) to the sump 66. The axial movement of the friction disks 148 to the right is limited by an annular abutting plate 154 which extends radially inwardly from and is secured to the right end of the cylinder 122 by a plurality of bolts, one of which is shown at 155.

The driven member 118 comprises a shaft 156 disposed coaxially with and spaced from the shaft 120 and has an annular member 158 (only the upper half being shown) mounted thereon for unitary rotation as by a splined connection shown generally at 159. The member 158 is fixed against axial movement relative to the shaft 156 by means of a shoulder 157 formed on the periphery of the shaft and abutting the right side thereof and a snap ring 157A secured in a groove in the shaft and abutting the left side thereof. The member 158 has an annular portion 160 which extends to the left and is dimensioned so as to be receivable in the aperture 140 in the pressure plate 114 upon movement of the latter to the right and is provided with a plurality of axially extending circumferentially spaced peripheral splines 162 which cooperatively receives a plurality of internal splines 163 formed on each of a plurality of friction disks 164 so that the disks 164 rotate unitarily with while being axially movable relative to the member 158. The disks 164 are interleaved with and adapted to engage the friction disks 148 carried by the drive member 112 so that the disks 148 and 164 comprise the engageable friction means 116. Disposed within the depression 140 and abutting both the vertical surface 144 therein and the outermost end of the member 158 is a return means in the form of a plurality of serially arranged Belleville springs 166 which biases the pressure plate axially to the left and away from the friction means 116.

The driven shaft 156 is rotatably mounted in an opening 167 in the housing 40 and has a peripheral groove 168 formed therein in radial alignment with a portion of the conduit 92 formed in the adjacent part of the housing 40 and intersecting the opening 167. An L-shaped passage 170 leads from the groove 168 and is open at the left end of the shaft 156 so that fluid from the conduit 92 may flow out of the passage 170 to the space between the shafts 120 and 156 and then radially outwardly through a plurality of radially extending, axially and circumferentially spaced passages 174 formed in the member 158 where it is discharged at the radial inner portion of the friction disks 148 and 164 and, upon being rotated, is forced radially outwardly by centrifugal force across the friction disks and then out of the clutch through the vents 152. A pair of sealing means 176 are carried in the housing 40 within the opening 167 and spaced on opposed axial sides of the groove 168 in a sealing relationship with the housing and the shaft 156 to prevent fluid from leaking therepast.

*Operation*

The operation of the first embodiment is described with reference to FIGS. 1–3. When the pedal lever 26 is in the released or clutched engaged positon, as shown in FIG. 1, the various forces acting in the system result in the friction means 116 being fully engaged. More particularly, the tension spring 30 biases the pedal lever 26 clockwise and, through the instrumentality of the linkage member 32, simultaneously biases the lever 34 counterclockwise and is capable of imposing a sufficient load through the lever 34 upon the right end of the valve stem 44 to overcome the effect of compression springs 54, 100 and 102 and various hereinafter described hydraulic forces to the extent necessary to maintain the position of valve stems 42 and 44 as shown in FIG. 1; that is, with the land 80 of valve stem 44 engaging the ring 98 and the left end of valve stem 42 engaging the inner end 56 of the bore means 38. The compression spring 54 and any hydraulic forces acting upon the valve stem 42 tend to bias the same to the right against the biasing force on the stem 42 by the action load of the spring 100, while the reaction load of spring 100 and the load on spring 102 tend to bias valve stem 44 axially to the right. The compression spring 100, by transferring the load imposed thereon by the valve stem 44, urges the valve stem 42 axially to the left. With this position of stem 44, as seen in FIG. 1, the chamber 82 is confluent with the opening 86 but is not confluent with the opening 88, since land 78 is covering the latter at this time; therefore, the flow of cooling fluid from the sump 66 to the clutch assembly 24 through the conducting means consisting of conduit means 92 and 94 is blocked or inhibited by the cooling fluid control portion 41 of the control valve 22.

In clutch engaged position, spring 100 has a sufficient load imposed thereon by the valve stem 44 to bias the valve stem 42 into abutting engagement with inner end 56 of the bore means 38. In this position the conducting means comprised of the conduits 68 and 72 are joined in a confluent relationship by the chamber 50 of the hydraulic fluid control and pressure modulating portion 39 of the control valve 22 so that fluid 70 is supplied at full pump pressure from the sump 66 to the hollow 130 where a hydraulic load is applied to the pressure plate 114 to bias the same axially to the right to cause the frictional engagement of the friction means 116. Pressurized fluid 70 is simultaneously supplied from the chamber 50 through the passage 58 to the chamber 57 at the left of the stem 42 so that the hydraulic pressure in chamber 57 and hollow 130 are equal. Because the stem 42 in the engaged position of FIG. 1 abuts the end wall 56, the area of the stem 42 upon which the fluid in the chamber 57 applies a hydraulic load is relatively small, and this hydraulic load and the load of the spring 54 imposes a combined biasing force on the stem 42 urging the same toward the right; however, in the engaged position such last mentioned combined biasing force is overcome by the biasing force of the spring 30 acting through the stem 44 and spring 100.

As the pedal lever 26 is manually depressed, it pivots counterclockwise and, by means of the linkage member 32, pulls the top end of the lever 34 to the right while the compression springs 100 and 102 urge the valve stem 44 axially to the right and keep the same in contact with the lever 34. This movement of the valve stem 44 has two results; the chamber 82 approaches the opening 88 and gradually becomes confluent therewith, while remaining confluent with the opening 86, to supply cooling fluid to the friction means 116 and, simultaneously, the load applied to the spring 100 by the stem 44 is decreased, so that the spring 100 elongates and loses compression and imposes a lesser load on the stem 42.

The decreased compression in spring 100 leads to decreased hydraulic load on the pressure plate 114. As described above, when hydraulic pressure is present in the chamber 50, it is also present in the chamber 57 and such pressure in the latter chamber tends to urge the valve stem 42 axially to the right. After some initial axially rightward movement of the stem 42 toward the position shown in FIG. 2, the hydraulic pressure in the chamber 57 impresses a load on the left end of the land 46 as well as within the bore 52 as was the case in the position shown in FIG. 1 when the stem 42 abutted the end 56 of the bore means 38. With the decrease in compression of the spring 100, the hydraulic pressure in chamber 57 is able to bias stem 42 axially to the right until chamber 50 is no longer confluent with the conduit 68 but is merely confluent with the opening 62. At this time the pressure in the chambers 50 and 57 is the same as the pressure in the hollow 130 and, if the combined load of the hydraulic fluid in chamber 57 and the spring 54 urging the stem 42 toward the right at this time is less than, the same as or greater than the load of the spring 100 urging the stem 42 to the left, then the stem 42 will, respectively, move to the left, remain stationary or move to the right; such movement continuing until the combined loads of the fluid in chamber 57 and the spring 54 equals the load of the spring 100 and the stem becomes stationary or until the stem engages the end 56 or snap ring 110.

If the load of spring 100 is less than the combined load and the stem 42 moves rightwardly toward the position shown in FIG. 3 wherein it abuts the snap ring 110, the chamber 50 becomes confluent with the vent opening 64 while remaining confluent with the opening 62 so that the chambers 50 and 57 and the hollow 130 are connected to the vent opening 64 and the fluid pressure therein is reduced. The stem 42 will remain in this rightward position until the load exerted by the hydraulic pressure in chamber 57 combined with the load of the spring 54 falls below the load of the compression spring 100, at which time the spring 100 will return the stem 42 toward the left.

Thus, it is seen that the hydraulic fluid control and pressure modulating portion 39 of the control valve 22 operates as a variable pressure regulator to control the flow and pressure of the fluid between the sump 66 and the hollow 130. By controlling the flow of fluid to the hollow portion 130, the valve portion 39 determines the position of the pressure plate 114; that is, when the hydraulic pressure in the chamber 130 results in a force acting on the pressure plate 114 which is less than the biasing force of the springs 166, the pressure plate 114 will be displaced to the left and be free from engagement with the friction means 116, and when the hydraulic pressure results in a force on the pressure plate 114 which is greater than the force imposed thereon by the spring means 166, then the pressure plate will be urged to the right and press the friction means 116 into frictional engagement. Since the load induced on the stem 42 by the spring 100 is manually variable, the pressure in hollow 130 may be regulated thereby controlling the load on the pressure plate 114 and the degree of frictional engagement it imposes on the friction means 116.

Since the position of the valve stem 42 is controlled by the loading action of the spring 100, and the loading action of the latter is controlled by movement of the valve stem 44, it is seen that the position of the valve stem 42 depends upon the position of the valve stem 44; it being understood that by varying the strength of the spring 100, the spring 54, the pressure output of the pump 97, the area of the left end of the land 46, or combinations thereof that the relative position of the stem 42 for various positions of the stem 44 may be varied to control the sequential operation of the valve stems 42 and 44.

The valve 22 of this embodiment has the various components thereof selected and arranged so that when the pedal lever 26 is approximately half depressed, as shown in FIG. 2, the valve stem 44 is moved sufficiently to the left so that the chamber 82 is fully confluent with both of the openings 86 and 88. Accordingly, movement of the pedal lever in either direction from this half-way position results in movement of the valve stem 44 which commences to move the chamber 82 from a confluent relationship with either the opening 86 or 88 depending on whether it is rightward or leftward movement respectively. Accordingly, it is seen that in the intermediate position full pump pressure and flow is passed from the conduit 94 through the chamber 82 to the conduit 92 and through the latter and the L-shaped passage 170 and passages 174 to the vicinity of the friction means 116, then radially across the friction disks 148 and 164 and out the vent passages 152 where it returns to the sump 66.

In an intermediate position, as shown in FIG. 2, the valve stem 42 has moved partially to the right from its fully left or engaged position and the chamber 50, which is fully confluent with the opening 62 at this time, becomes only partially confluent with the opening 60 and thereby continues directing fluid pressure from the conduit 68 to the conduit 72 and through the passage 128 to the chamber 130 wherein a hydraulic load is imposed upon the pressure plate 114 urging the same to engage the friction means 116. If the stem 44 is maintained in the intermediate position of FIG. 2, the hydraulic pressure will remain in chambers 50, 130 and 57 and, at such time that the hydraulic pressure in chamber 57 impresses a load on the left end of the stem 44 which when combined with the load impressed on the stem 42 by the spring 54 is greater than the load impressed on the stem 42 by the spring 100, the stem 42 will move to the right and the chamber 50 will no longer be in a confluent relationship with the opening 60 and will be solely confluent with the opening 62. It should be noted that, in the centralized intermediate position of the stem 42 the chamber 50 is confluent with the opening 62 but not the openings 60 and 64.

From the intermediate position of FIG. 2, further depression of the clutch pedal lever 26 toward its disengaged position will result in the stem 44 moving to the right thereby decreasing the load on spring 100 and the load imposed by the latter on the stem 42, so that the hydraulic force, which as described immediately above has been trapped in the chambers 50 and 57 and conduit 72 by the chamber 50 being solely confluent with the opening 62, imposes a biasing force on the stem 42 which is greater than the force imposed thereon by the spring 100 and the stem 42 moves to the right from its intermediate position so that chamber 50 moves to a confluent relationship with the vent opening 64 while remaining confluent with the opening 62 and the hydraulic pressure in chambers 50, 57 and 130 and the conduit 72 is relieved as the fluid is vented through the conduit 74; such venting continuing until the hydraulic load upon the left end of stem 42 combined with the load of spring 54 becomes equal to the load imposed on the stem 42 by the spring 100 at which time the stem 42 will no longer move to the right. If the fluid has been vented sufficiently so that the combined load is less than the load of spring 100, the stem 42 will be urged to the left until such load becomes equal.

Upon movement of the clutch pedal lever 26 upwardly to its engaged position from the intermediate position of FIG. 2, the stem 44 moves to the left thereby imposing a greater load upon the stem 42 by means of the compression spring 100 and urges the stem 42 to the left against the combined loads of the spring 54 and the load acting thereon as a result of the hydraulic fluid in chamber 57. This leftward movement of the stem 42 brings the chamber 50 in a fully confluent relationship with the opening 60 so that pressurized hydraulic fluid flows from the conduit 68 through the chamber 50 and through the conduit 72 and L-shaped passage 128 to the chamber 130 where a hydraulic load is imposed upon the pressure plate 114 urging the latter to the right to impose an engaging force on the friction means 116.

It is seen that in the clutch fully engaged and clutch fully disengaged positions of the hydraulic control valve 22, the stem 44 has moved to positions wherein the chamber 82 is not confluent with both the openings 86 and 88 and that cooling and lubricating fluid is not passing to the multiple disk clutch assembly 24. Consequently when the clutch pedal lever 26 is fully depressed to the disengaged position the friction means 116 is fully disengaged and no fluid flows between the friction disks 148 and 164 to create viscous drag accompanied by a viscous transmission of torque between the friction disks and, for example, the gears of a transmission associated with the clutch assembly 24 (not shown) may be shifted without interference caused by viscous drag.

A graphic representation of the variation in the hydraulic pressure in chamber 130, referred to as the clutch applied pressure, and the variation in the line pressure of the cooling and lubrication fluid in conduit 92, referred to as the lubrication applied pressure, as the control valve 22 is actuated is shown in FIG. 4. Applied pressure in p.s.i. is plotted against percent (%) of axial travel of the regulator level 34; the line C representing clutch applied pressure and the line L representing lubrication applied pressure at the corresponding percent of travel and 0% representing the fully disengaged position of the lever as shown in FIG. 3 and 100% representing the fully engaged position as shown in FIG. 1. At 0% of travel there is no applied pressure to the pressure plate 114 so that the friction means 116 is disengaged and there is no lubrication applied pressure being supplied to the friction means for cooling and lubricating purposes.

After approximately 7% travel of the lever 34 toward its engaged position, the cooling and lubrication fluid control portion 41 of the valve 22 starts to open, that is, chamber 82 becomes slightly confluent with opening 86 and lubricating fluid pressure and flow in conduit 92, as indicated commences. As shown by the line L in FIG. 4, the build-up of pressure in conduit 92 is rapid and reaches a maximum at about 9% of actuator travel and then remains relatively constant at this maximum until lever 34 reaches approximately 75% of its travel. Upon movement past 75%, the chamber 82 commences to move to the left of opening 88, being completely removed from the opening 88 at 85% of travel at which time the cooling pressure in conduit 92 becomes zero.

The build-up of the clutch applied pressure, as shown by line C in FIG. 4, does not commence until approximately 20% travel of the clutch actuator lever 34 and then such build-up is a straight line function reaching its maximum value (representing full pressure of the pump 97) after the actuator lever has completed almost 70% of its travel.

It is, therefore, apparent that at 0% of actuator travel representing the fully disengaged position there is no lubrication or clutch applied pressure, that the lubrication applied pressure commences prior to the existence of any clutch applied pressure so that during the period in which the clutch assembly 24 is becoming engaged, there is lubrication applied pressure, and such lubrication applied pressure is discontinued when the clutch is fully engaged and cooling and lubrication of the friction means 116 is no longer needed since the friction disks 148 and 164 are no longer slipping relative to each other. Upon movement from the engaged to the disengaged position, lubrication applied pressure commences and reaches its maximum before the clutch applied pressure begins to decrease thereby commencing disengagement and slipping of the friction disks 148 and 164. After the clutch applied pressure has reached zero and the friction disks 148 and 164 become frictionally disengaged, the lubrication applied pressure is terminated since it is no longer needed for cooling or lubricating purposes and would impose a viscous drag between the friction disks.

With reference to FIG. 4, it should be noted that line C represents the hydraulic pressure in the chamber 130 being applied to the pressure plate 114 and that a certain amount of pressure will be required to generate a force sufficient to cause preliminary movement of the pressure plate against the biasing force of springs 166, and other well known frictional forces, sufficient to engage the friction means 116 and thereby cause initial frictional engagement of the friction disks 148 and 164. Accordingly, the actual clutch engagement commences at a percent of actuator travel which is somewhat greater than the 20% shown in FIG. 4.

The sequential relationship of the lubrication and clutch applied pressure may be varied in a relatively simple manner. It has already been described that the movement of valve stem 42, for a given movement of the valve stem 44, may be varied at least by varying the strength of the spring 100, the spring 54, the pressure output of pump 97, the area of the left end of the land 46 or various combinations thereof. Accordingly, not only can the commencement of clutch applied pressure be changed but also the slope of the line C and the position at which maximum pressure is reached. The commencement and termination of lubrication applied pressure can also be varied by varying the location and/or size relationship of the chamber 82 and the passages 86 and 88.

In FIGS. 5–7 a second embodiment of this invention is shown wherein the clutch applied pressure and lubrication applied pressure are both at least partially hydraulically regulated. This embodiment includes a clutch pedal mechanism shown generally at 20, a hydraulic pressure control valve shown generally at 22A and a multiple disk clutch assembly shown generally at 24. The pedal mechanism 20 and the clutch disk assembly 24 are identical to those described in the first embodiment of FIGS. 1–3 and each component of the same serves the same function as previously explained. For this reason, a description of the same will not be repeated for this embodiment.

The control valve 22A includes a hydraulic fluid control and pressure modulating portion 39 and a cooling and lubrication control portion 180. The portion 39 of the control valve 22A is identical to the portion 39 of the control valve 22 of this embodiment of this invention shown in FIGS. 1–3 and, for this reason, a repetition of the detailed description of the same is not deemed necessary. The portion of the valve stem 42, as in the embodiment of FIGS. 1–3, is controlled by the loads applied to the left end thereof by the combined action of spring 54 and the fluid pressure in chamber 57 and the load applied to the right end thereof by the coil compression spring 100. The compression of coil spring 100 is controlled by the actuation of an actuator stem 44A, which stem includes a pair of spaced lands 76A and 80A slidingly received in the larger bore 45 of the bore means 38. A sleeve 98A is secured in the bore 45 and adapted to alternately engage the lands 76A and 80A to limit movement of the stem 44A to the right and left respectively. A reduced pilot portion 103A extending axially to the left from the land 76A is pilotingly received in the spring 100, while the latter engages the left end of the land 76A. The coil compression spring 102 also engages the left side of land 76A and constantly tends to bias the actuator stem 44A to the right. Accordingly, it is seen that the actuator stem 44A functions as an axial extension of the lever 34 and moves unitarily therewith to actuate the compression spring 100.

As shown in the sequence of positions illustrated in FIGS. 5-7, upon depression of the lever 26 from its engaged position shown in FIG. 7, the lever 34 moves clockwise accompanied by rightward movement of the actuator stem 44A as the spring 102 maintains the right end of the stem 44A in pressing engagement with the lever 34. This reduces the compression of spring 100 and the load imposed by the latter on the valve stem 42 so that the stem 42 is biased toward the intermediate position of FIG. 6 by the combined loads of the spring 54 and the hydraulic pressure in chamber 57 acting on the left end thereof. In the intermediate position, the chamber 50 is only partially confluent with the opening 60 and continues to pass fluid pressure from the opening 60 to the opening 62 and the chamber 57. Further movement of the stem 44A to the right toward the position shown in FIG. 7 results in the compression of spring 100 being reduced sufficiently so that the combined loads of the pressure in chamber 57 and the spring 54 acting on the left end of the stem 42 biases the latter to the right until the chamber 50 is no longer confluent with the opening 60 and is solely confluent with the opening 62. If the pressure of the fluid trapped in chambers 50, 57 and 130 at this time applies a sufficient load to the left end of the stem 42 to bias the same further to the right or if the actuator stem 44A is moved further to the right, as shown in FIG. 7, to further reduce the compression of spring 100, the valve stem 42 will move further to the right until the right end of the land 48 thereof engages the snap ring 110 and the chamber 50 moves to a confluent relationship with the vent opening 64 while remaining confluent with the opening 62. Such latter rightward movement of the stem 42 results in the fluid in chambers 50, 57 and 130 being vented through the conduit 74 to the sump 66.

The lubricating and cooling fluid control portion 180 of the hydraulic control valve 22A is adapted to be operated by the fluid pressure in the conduit 72; such pressure being equal to the pressure in chambers 50, 57 and 130, since the chamber 50 is always confluent with the opening 62. More particularly, a second bore 182 is formed in the housing 40 and receives therein a valve stem 184. The stem 184 has a pair of axially spaced lands 186 and 188 disposed to the left and right respectively, which lands slidingly and sealingly engage the wall of the bore and define a movable chamber 190 therebetween bounded axially by the lands and radially by the reduced portion of the stem intermediate the lands and the wall of the bore 182. The stem 184 also includes a pilot portion 192 extending axially to the right from the land 188, which portion is pilotingly received in a coiled compression spring 194 disposed intermediate and abuttingly engaging the left end of land 188 and the closed right end 196 of a larger diameter bore 183, extending to the right from the bore 182. The spring 194 is adapted to normally bias the stem 184 to the left so that the left end of the land 186 engages an annular shoulder 198 formed at the left end of the bore 182 by the junction therewith of a counterbore 200. Confluent with the counterbore 200 and bore 182 to the left of the land 186 is a conduit 202 which connects to and is confluent with the conduit 72 so that when pressure is present in chambers 50 and 130 the same will be present in conduit 202 and imposes a hydraulic force on the left end of the stem 186 tending to urge the same to the right against the biasing force impressed on stem 184 by the spring 194.

A second coiled compression spring 208 is received in the bore 183 and spaced radially outwardly from the spring 194. In the disengaged position of the stem 184 shown in FIG. 7, the spring 208 is preloadingly compressed between the end 196 of the bore 183 and an annular slip ring 210 slidingly received in the bore 183 and abutting a shoulder 212 formed by the junction of the bores 182 and 183. The slip ring 210 is adapted to engage the right side of the land 188 when the stem 184 reaches its intermediate position so that the preloaded spring 208 assists the spring 194 in imposing a force on the stem 184 resisting the movement thereof to the right from its intermediate to its engaged position.

Referring to FIG. 5 wherein the engaged position of the various components is shown, the chamber 50 at this time is confluent with both the openings 60 and 62 thereby supplying pressurized fluid to the line 72 and through the conduit 202 to the left end of the stem 184. When the clutch assembly 24 is fully engaged so that full line pressure is present in the chamber 130 such pressure is sufficient to bias the stem 184 completely to the right as shown in FIG. 5 wherein the pilot portion 192 engages the right end 196 of bore 183. Conducting means for conducting fluid pressure from the sump to the clutch assembly 24 wherein such fluid is operative to cool and lubricate the friction means 116 comprises a pair of offset conduits 92A and 94A formed in the housing 40. The conduit 94A connects to and is confluent with the conduit 68 so that pressurized fluid is supplied thereto from the sump 66 by the constant pressure pump 97 and connects to and communicates with an opening 204 formed in the bore 182 at a position which is confluent with the chamber 190 when the stem 184 is in the engaged and intermediate positions shown in FIGS. 5 and 6 and which is sealingly covered by land 188 when the stem 184 is in its disengaged position shown in FIG. 7. It should be understood that, as in the embodiment of FIGS. 1-3, the intermediate position shown in FIG. 6 is not the central position of the stem 42 and that in the central intermediate position, the chamber 50 is confluent with the opening 62 but not the openings 60 and 64.

The conduit 92A is confluent with the annular groove 168 in the shaft 156 in the same manner as the conduit 92 of the embodiment of FIGS. 1-3, and also connects to and is confluent with an opening 206 in the wall of the bore 182; the opening 206 being offset axially to the left of the opening 204 so that the opening 206 is sealingly closed by the land 186 when the stem 184 is in its engaged position as shown in FIG. 5 and is confluent with chamber 190 when the stem 184 is in its intermediate and disengaged positions as shown in FIGS. 6 and 7. Accordingly, the lubricating fluid control portion 180 of the hydraulic control valve 22A is interposed in the conduit means for conducting lubricating and cooling fluid pressure from the sump 66 to the cluch assembly 24 and is adapted to control the flow of such fluid.

*Operation*

Commencing with the clutch pedal lever 26 in its lower or disengaged position, as seen in FIG. 7, so that the stem 44A is in its full right position thereby relieving the compression in spring 100, and with the spring 54 unopposedly biasing the stem 42 to its full right position against the snap ring 110, the chamber 50 is confluent with the openings 62 and 64 and the chambers 50, 57 and 130 and conduit 72 as well as conduit 202 are vented through conduit 74. Accordingly, since there is no fluid pressure imposing a force on the left end of valve stem 184, the stem is biased to its full left position against the shoulder 198 by the compression spring 194 and the land 188 sealingly covers the opening 204 so that fluid is blocked from flowing from conduit 94A to conduit 92A.

Upon upward movement of the lever 26 and corresponding leftward movement of the actuator stem 44A the chamber 50 in valve stem 42 remains confluent with the opening 62 and becomes confluent with the opening 60 so that fluid pressure is admitted from the conduit 68 to the conduit 72 and through the latter to the chamber 130 wherein clutch applying pressure is applied to the pressure plate 114. At this time hydraulic fluid also passes through conduit 202 to impose a load on the left end of the stem 184 tending to bias the same to the right against the biasing force impressed thereon by the spring 194. The spring 194 is preferably a relatively weak spring so that the hydraulic fluid rapidly biases the stem 184 to the right until the same engages the slip ring 210. The preloaded compression spring 208 then acts in conjunction with the spring 194 to inhibit further rightward movement of the stem 184 so that a substantially higher hydraulic load is required to move the stem to its fully engaged position.

Further upward movement of the lever 26 results in the stems 44A and 42 assuming their engaged position wherein full line pressure from the pump 97 is directed to the conduit 72 and chamber 130 and simultaneously to the conduit 202, such full line pressure inducing a sufficient force to the left end of the stem 184 to bias the same completely to the right, against the combined biasing force of the springs 194 and 208, to its fully engaged position with the pilot portion 192 engaging the wall 196 as shown in FIG. 5. In this position of the stem 184, the land 186 blocks the opening 206 so that no fluid 70 may flow from the conduit 94A to the conduit 92A to cool and lubricate the clutch means 116.

In going from the engaged to the disengaged position of the valve stem 42, the same reduces the pressure in conduit 72 and chamber 130 and simultaneously the pressure in conduit 202 is also reduced. Such reduction reduces the force impressed on the left end of the stem 184 by the hydraulic fluid 70 so that the springs 194 and 208 bias the stem toward the left to the position wherein spring 194 alone biases the stem and the chamber 190 becomes confluent with both of the openings 204 and 206 and fluid 70 is passed from conduit 94A to 92A. Further reduction in the fluid pressure in conduit 72 by the stem 42 moving further towards its right or disengaged position further reduces the pressure acting on the valve stem 184 so that the same moves farther to the left; the chamber 190 being of substantial axial length so that the same is confluent with the openings 204 and 206 during a substantial portion of such axial movement. When the stem 42 has reached its disengaged position and completely vents the conduits 72 and 202, the stem 184 is biased completely to the left by the unopposed action of spring 194 and once again blocks the flow of fluid from flowing between conduit 94A and 92A.

A graphic representation of the variation of the hydraulic pressure in chamber 130, referred to as the clutch applied pressure, and the variation in the line pressure of the cooling and lubricating fluid in conduit 92A, referred to as the lubrication applied pressure, as the control valve 22A is actuated is shown in FIG. 8. Applied pressure in p.s.i. is plotted against the percent of axial travel of the regulator lever 34; the line C-1 representing clutch applied pressure and the line L-1 representing lubrication applied pressure at the corresponding percent of travel and 0% representing the fully disengaged position of the lever as shown in FIG. 7 and 100% representing the fully engaged position as shown in FIG. 5. At 0% of travel there is no applied pressure to the pressure plate 114 so that the friction means 116 is disengaged and there is no lubrication applied pressure being supplied to the friction means for cooling and lubricating purposes.

After approximately 20% of actuator travel, so that the valve stem 42 has reached approximately the position shown in FIG. 6 and the chamber 50 confluently connects the openings 60 and 62, clutch applied pressure, represented by the line C-1, commences to pass in conduit 72 and flow through the same to chamber 130 where it impresses a load on the pressure plate 114. When the clutch applied pressure reaches approximately 25 p.s.i. the valve stem 184 has moved sufficiently toward its intermediate position so that the chamber 190 confluently connects the openings 204 and 206 so that fluid 70 flows in conduit 92A to the clutch means 116 to cool and lubricate the same. By the time the clutch applied pressure has reached approximately 35 p.s.i., the lubricant applied pressure indicated by the line L-1 reaches its maximum; such being indicated in the drawings by the intermediate position of FIG. 6 wherein the right end of land 188 of stem 184 has engaged the slip ring 210 and is maintained in such position by the combined action of springs 194 and 208. Since the pressure plate 114 must be urged to the right with a sufficient force to overcome the biasing effect of springs 166 and the incidental well-known friction acting thereon, the lubrication applied pressure L-1 will reach its maximum prior to any engagement of the clutch disks 148 and 164 by the pressure plate 114.

At approximately 65% of actuator travel, when the clutch applied pressure C-1 has reached approximately 65 p.s.i., the fluid entering the bore 182 from the conduit 202 reacts against the valve stem 184 with a sufficient force to bias the same to the right against the combined loads of the spring 194 and the preloaded spring 208, so that the land 186 commences to block the opening 206 thereby reducing the flow of lubrication and cooling fluid 70 to conduit 92A. By the time approximately 68% of actuator travel is reached, the clutch applied pressure C-1 has reached its maximum and such pressure acting on the left end of valve stem 184 is sufficient to completely bias the same to the right to its engaged position of FIG. 5 with the land 186 completely blocking the opening 206 and preventing the flow of any coolant fluid to the conduit 92A.

Referring now to FIG. 9 a modification in the land 78 of the valve portion 41 of the embodiment of FIGS. 1-3 is shown wherein the land 78 of FIGS. 1-3 is made to project less axially to the left, as indicated at 78A in FIG. 9, resulting in an axially longer chamber 82A between the lands 76 and 78A so that when the stem 44A reaches its engaged position, the openings 86 and 88 will remain confluent and lubrication applied pressure will continue. This is indicated graphically in FIG. 4 by the dotted line indicated at L-1 which continues from the substantially horizontal portion of the line L. This continuation of lubrication applied pressure insures that, in the event excessive heat has been generated during the engagement of the clutch 24, fluid 70 will be present to complete the cooling of the clutch.

Referring now to FIG. 10, the valve 180 of the embodiment of FIGS. 5-7 has been modified to obtain a slight modification in the operation of the control system; the modified valve being indicated by the numeral 180A. In this embodiment the bore 182A is of uniform diameter, the larger bore 183 having been eliminated, and slidingly receives spaced lands 186 and 188 of a valve stem 184A. As in the embodiment of FIGS. 5-7, the conduits 202, 94A and 92A intersect the bore 182A in the same manner that they intersect the bore 182.

The coil compression spring 194 engages the right end of land 188 and the closed right end 196A of the bore 182A and is adapted to bias the stem 184 to the left. The pilot portion 192A is axially longer than the pilot portion 192 of the valve 180 so that in the intermediate position the pilot portion 192A engages the closed right end 196A of the bore 182A and inhibits further movement of the stem 184A to the right regardless of any further increase in the clutch applied pressure. Accordingly, in the operation of the embodiments of FIG. 10, the horizontal line L-1 of FIG. 8, representing the lubrication applied pressure, becomes extended by the dashed line indicated at L-2 since in both the intermediate and the engaged positions the chamber 190 will be confluent with the openings 204 and 206.

Referring now to FIG. 11 a modification of the embodiment of FIGS. 5-7 is shown in its disengaged position. Other than the modification in conduit 72, this embodiment remains identical to the embodiment of FIGS. 5-7 and the description of the like portions thereof will not be repeated.

More particularly, a pressure build-up and vent valve, shown generally at 209 has been incorporated in conduit 72 between the connection therewith of the conduit 202 and the opening 113 in the housing 40. The valve 209 includes a pressure build-up portion 211, which portion includes a bore 213 formed in the housing 40. Openings 214 and 216 are formed in the upper and lower end faces respectively of the bore 213 and a ball shaped stem 218 is slidably mounted in the bore 213. The upper end of the bore 213 is formed as a valve seat and is adapted to be sealingly engaged by the ball 218 to close the opening 214 thereby preventing pressurized fluid 70 from flowing through the bore 213. A coiled compression spring 220 is compressed between the ball 218 and the lower end of the bore 213 and biases the ball upwardly into a sealing engagement with the upper end of the bore. An axially extending groove 222 is formed in the wall of the bore 213 and commences from approximately the midpoint of the ball 218 when it is in its upper position and extends for the full length of the bore including the lower end wall thereof. Accordingly, the ball 218 remains in a seated and sealing relationship with the upper end of the bore 213 until the pressure in the upper portion of conduit 72 becomes sufficiently great to force the ball 218 downwardly against the biasing effect of the spring 220. Upon the ball 218 being biased downwardly past the commencement of the groove 222, pressurized fluid 70 may flow past the ball and through the groove 222 and lower portion of the bore to the lower portion of the conduit 72A and through the same to the chamber 130.

The purpose of the valve portion 211 is to provide for a pressure build-up in the upper portion of the conduit 72 and simultaneously therewith in the conduit 202 so that the valve stem 184 of valve 180 will be forced to the right by such fluid pressure to bring the chamber 190 in a confluent relationship with the conduits 94A and 92A and thereby provide cooling and lubricating fluid to the friction means 116 prior to the admission of pressurized fluid 70 to the chamber 130. Thus, the lubrication and clutch applied pressure curve for this embodiment will resemble that of FIG. 4 rather than that of FIG. 8 in that the lubricant applied pressure will commence prior to any clutch applied pressure in the conduit 72A. In moving from the engaged to the disengaged position wherein the conduits 72A and 72 must be vented through the vent conduit 74, upon the chamber 50 becoming confluent with the openings 62 and 64, the fluid pressure in conduit 72 will be vented whereupon the ball 218 will be seated against the upper end of bore 213 thereby closing the opening 214 and preventing venting of the conduit 72A and chamber 130.

Means are provided to allow the conduit 72A and chambers 130 to vent and takes the form of a venting portion 224 of the valve 209 disposed between the conduit 72A and 72 parallel with the valve portion 211. The venting portion 224 includes a chamber 226 having upper and lower openings 228 and 230 respectively; the opening 228 being connected to a conduit 232 which connects with the conduit 72 and the opening 230 being connected to a conduit 234 which in turn connects with the conduit 72A. A check valve 236 is secured to a relatively weak leaf spring 238, the leaf spring being in turn secured as by a screw 240 to the lower wall of the chamber 226. The leaf spring imposes a light biasing load against the check valve 236 which urges the latter towards sealing engagement with the opening 230.

When the control system is in its disengaged position and no fluid is present in the conduits 72 and 72A, the check valve 236 closes the opening 230 in response to the urging by the leaf spring 238. Upon the valve stem 42 moving towards its engaged position and thereby admitting pressurized fluid 70 to the conduit 72, the fluid pressure builds up behind the valve portion 211 and maintains the check valve 236 in sealing engagement with the opening 230 so that the pressure also builds up behind the valve portion 224. Upon the valve stem 42 moving to a position wherein the chamber 50 is confluent with the openings 62 and 64 and thereby vents the conduit 72, although the ball 218 closes the opening 214 and prevents venting of the conduit 72A through the valve portion 211, the fluid pressure 70 in conduit 72A and chambers 130 acts against the check valve 236 and forces the same upwardly against the biasing affect of the leaf spring 238 so that the pressurized fluid 70 in conduit 72A may vent therepast. As the springs 166 force the pressure plate 114 to the left, the fluid 70 in chamber 130 is forced out through the conduit 72A and past the check valve 236 to completely vent the chamber 130.

While several embodiments of this invention have been shown and described it is readily apparent that many modifications can be made therein without departing from the scope of this invention as defined by the following claims.

What is claimed is:

1. A clutching system comprising in combination a driving shaft, a driven shaft, a hydraulically operated clutch for coupling said shafts in a driving relationship, source means of pressurized fluid, a first conducting means connecting said source means to said clutch for supplying engaging fluid thereto and including a first valve means, a second conducting means connecting said source means to said clutch for supplying cooling fluid thereto and including a second valve means, said first valve means being a manually variable pressure and flow regulator and operative to control the flow and pressure of the fluid passing through said first conducting means to said clutch, and said second valve means being an on/off valve and operatively connected to said first valve means by operating means for concomitant movement with said first valve means, said second valve means being moved by said operating means to position said second valve means, to allow fluid to flow in said second conducting means when fluid is flowing in said first conducting means and being moved by said operating means to a position to terminate the flow of fluid in said second conducting means when fluid ceases to flow through said first valve means in said first conducting means to said clutch.

2. The clutching system of claim 1 wherein said second valve means has first and second opposed positions and is operative in said first position to block said second conducting means thereby inhibiting the flow of fluid therethrough and upon movement toward said second position is operative to allow fluid to flow through said second conducting means, resilient means normally biasing said second valve means to said first position, said operating means moving said second valve means to its second position against the biasing force of said resilient means, said operating means at this time being operative simultaneously with the movement of the first valve means and the passage of fluid in first conducting means, said operating means allowing said resilient means to bias said second valve means to its first position upon concomitant movement of said first valve means to a position terminating the flow of fluid in said first conducting means.

3. A clutching system according to claim 2 wherein said operating means comprises a third conducting means operatively connected between said first conducting means and said second valve means for conducting fluid from said first conducting means to said second conducting means wherein said fluid is operative to move said second valve means against the biasing effect of said resilient means.

4. A clutching system according to claim 3 wherein said third conducting means is connected to said first conducting means at a position intermediate said first valve means and said clutch, and a pressure build-up valve is interposed in said first conducting means at a position intermediate said clutch and said third conducting means for building up the pressure in said first conducting means and said third conducting means and moving said second valve means against the biasing effect of said resilient means before said build-up valve allows fluid to flow to said clutch means.

5. A clutching system according to claim 2 wherein said first valve means has opposed first and second positions and a position intermediate the same, second resilient means biases said first valve means to its first position wherein the same blocks the flow of fluid in said first conducting means, manually operable means engages said second resilient means for varying the load imposed on said first valve means by said second resilient means, a portion of said manually operable means being said second valve means, said manually operable means being movable to a position wherein it reduces the load of said second resilient means on said first valve means whereby the same moves toward its second position and simultaneously positions said second valve means in its second position and being movable to a position wherein it increases the load of said second resilient means on said first valve means whereby the same moves to its first position and simultaneously positions said second valve means in its first position.

6. A clutching system comprising in combination a driving shaft, a driven shaft, a hydraulically operated clutch for coupling said shafts in a driving relationship, source means of pressurized fluid, a first conducting means connecting said source means to said clutch for supplying engaging fluid thereto and including a first valve means, a second conducting means connecting said source means to said clutch for supplying cooling fluid thereto and including a second valve means, said first valve means being a manually controllable variable pressure and flow regulator and having a first position wherein the same blocks the flow of fluid in said first conducting means, a second position wherein the same vents said clutch means and intermediate position wherein the same allows fluid to flow in said first conducting means, said second valve means having opposed first and second positions and being operative in said first position to block the flow of fluid in said second conducting means and upon movement toward its second position being operative to allow fluid to flow in said second conducting means, separate resilient means biasing said first and second valves to their first positions with the resilient means biasing said first valve including manually operable means for varying the biasing force thereof, and means connected with said first conducting means for directing a portion of said fluid flowing through said first valve means to both said first and second valve means wherein the portion of said fluid reacts on said valve means in opposition to the resilient means acting thereon and urges said valve means toward their second positions.

7. A clutching system according to claim 6 wherein said second valve means has an intermediate position in addition to and intermediate its first and second positions and being operative in its first and second positions to block the flow of fluid in said second conducting means and being operative in its intermediate position to allow fluid to flow in said second conducting means, said portion of said fluid flowing to said second valve means biasing the same against said resilient means to said intermediate position wherein cooling fluid is allowed to flow in said second conducting means and upon increased pressure of the portion of said fluid the same biases said second valve means to its second position wherein fluid is blocked from flowing in said second conducting means, and upon a decrease in the pressure of the portion of said fluid said resilient means biases said second valve means from its second position to its intermediate position and finally to its first position.

8. The clutch system of claim 7 wherein said resilient means biasing said second valve means includes a first and a second spring, said first spring constantly biasing said second position whereby said second spring acts as a resilient preloaded and engaging said valve means upon the same reaching its intermediate position and imposing a biasing load thereon as the same moves from its intermediate to its second position whereby said second spring acts as a resilient stop for maintaining said second valve means in its intermediate position until said portion of said fluid flowing to said second valve means reaches a much higher pressure than was necessary to bias said second valve means from its first to its intermediate position against the load of said first spring.

9. A clutching system comprising in combination a driving shaft, a driven shaft, a hydraulically operated clutch for coupling said shafts in a driving relationship, source means of pressurized fluid, a first conducting means connecting said source means to said clutch for supplying engaging fluid thereto and including a first valve means, a second conducting means connecting said source means to said clutch for supplying cooling fluid thereto and including a second valve means, said first valve means being a manually controllable variable pressure and flow regulator and having a first position wherein the same blocks the flow of fluid in said first conducting means, a second position wherein the same vents said clutch means and an intermediate position wherein the same allows fluid to flow through said first conducting means to said clutch, said second valve means having opposed first and second positions and being operative in said first position to block the flow of fluid in said second conducting means and upon movement toward its second position being operative to allow fluid to flow in said second conducting means, said first and second valve means being axially movable between their positions and being axially aligned, resilient means disposed between said first and second valve means, manually operable means for moving said second valve means towards said first valve means and compressing said resilient means therebetween whereby movement of said second valve means between its first and second positions varies the load of said resilient means on said first valve means, said resilient means biasing said first valve means toward its first position, and means including at least a portion of the fluid flowing through said first valve means acting on said first valve means in opposition to said resilient means acting thereon and urging said first valve means toward its second position.

10. A clutching system comprising in combination a driving shaft, a driven shaft, a hydraulically operated clutch for coupling said shafts in a driving relationship, source means of pressurized fluid, a first conducting means connecting said source means to said clutch for supplying engaging fluid thereto and including a first valve means, a second conducting means connecting said source means to said clutch for supplying cooling fluid thereto and including a second valve means, said first valve means being manually controllable variable pressure and flow regulator and having a first position wherein the same blocks the flow of fluid in said first conducting means, a second position wherein the same vents said clutch and an intermediate position wherein the same allows fluid to flow through said first conducting means to said clutch, said second valve means having opposed first and second positions and being operative in said first position to block the flow of fluid in said second conducting means and upon movement toward its second position being operative to allow fluid to flow in said second conducting means, said first and second valve means being axially movable between their positions and being axially aligned, resilient means disposed between said first and second valve means, manually operable means for moving said second valve means to its first position towards said first valve means and compressing said resilient means therebetween and toward its second position reducing the compression on said resilient means whereby movement of said second valve means between its first and second positions varies the load of said resilient means on said first valve means, said resilient means biasing said first valve means towards its first position, and means connected with said first conducting means for directing a portion of the fluid flowing through said first valve means to said first valve means wherein the portion of said fluid reacts on said first valve means in opposition to said resilient means acting thereon and urges said first valve means towards its second position.

11. A clutching system according to claim 10 wherein said second valve means blocks the flow of fluid in said second position wherein it allows fluid to flow in said sition and includes a position intermediate said first and second positions wherein it allows fluid to flow in said second conducting means, said second valve means moving through said intermediate position upon movement thereof from its first to its second and from its second to its first positions, said first valve means being in its first and second position when said second valve means is in its first and second position respectively, and when said second valve means is in its intermediate position said first valve means is in the one of its positions dictated by the resultant force of said resilient means and said portion of said fluid acting thereon.

12. A clutching system according to claim 10 wherein said first valve means includes a second resilient means biasing the same towards its second position in conjunction with the portion of said fluid and in opposition to said resilient means compressed between said first and second valve means.

13. A clutching system according to claim 12 wherein said second valve means has a third and a fourth resilient means acting thereon, said third resilient means biasing said second valve means toward its first position and said fourth resilient means biasing said second valve toward its second position, said third resilient means imposing a greater force on said second valve means than said fourth resilient means, and said manually operable means reduces the biasing force of said third resilient means on said second valve means so that said fourth resilient means is operative to move said second valve means to its second position.

14. A clutch system comprising in combination a driving shaft; a driven shaft; a hydraulically operated clutch for coupling said shafts in a driving relationship and including a pair of friction means adapted to be pressed into frictional engagement and with each of the same connected in a driving relationship with one of said shafts, piston means for pressing said friction means into frictional engagement and return means for normally urging said piston means to a position wherein the same does not press said friction means into engagement; source means of pressurized fluid; a first conducting means connecting said source means to said clutch for supplying engaging fluid thereto to force said piston means against the urging of said return means into a pressing relationship with said friction means; a second conducting means connecting said source means to said clutch for supplying cooling fluid thereto for cooling and lubricating said friction means; a valve means assembly including a housing having an axially elongated bore therein having inner and outer ends; a first and a second axially aligned valve stem disposed in said bore and being axially movable relative thereto with said first stem being disposed adjacent said inner end and intermediate said inner end and said second stem; means including said bore and said first stem forming a variable chamber between said first stem and said inner end adapted to vary in volume as said first stem moves axially relative to said inner end; means forming a first axially movable chamber and including said first stem and said bore; said first conducting means including first and second portions with said first portion connecting said source means with said bore and said second portion connecting said bore with said clutch; the arrangement of said portions and said first chamber being such that, when said first stem is in a first position displaced toward the inner end of said bore, said first chamber connects said first and second portions in a confluent relationship; vent means connected to said bore and adapted to ventingly conduct fluid therefrom and being blocked by said first stem when the same is in its first position; the arrangement of said vent means, said portions and said first chamber being such that, when said first stem moves to a second position axially displaced away from said inner end, said first chamber ceases to be in a confluent relationship with said first portion and connects said second portion and said vent means in a confluent relationship and, when said first stem is in a position intermediate said first and second positions, said first chamber is confluent with said second portion and said first stem blocks said first portion and said vent means; means connecting said first movable chamber with said variable chamber for conducting fluid therebetween which fluid, when entering the variable volume chamber, exerts a force on said first stem urging the same axially outwardly away from said inner end; first resilient means disposed between said first stem and said bore and constantly urging said first stem axially outwardly; second resilient means disposed between said first and second valve stems and adapted to be compressed therebetween and to bias said first valve stem to its first position; said second conducting means including third and fourth portions with said third portion connecting said source means to said bore and said fourth portion connecting said bore to said clutch; means including said second stem and said bore forming a second axially movable chamber; said second stem having first and second positions and being axially spaced farther from said inner end in its second position than in its first position and in its first position said second resilient means is compressed between said stems; the arrangement of said second chamber and said third and fourth portions being such that, when said second valve stem is disposed in its second position, said second stem blocks one of said third and fourth portions and inhibits the flow of fluid therebetween and, when said second stem is moved toward its first position and compresses said second resilient means, said second chamber connects said third and fourth portions in a confluent relationship whereby fluid may flow therebetween; third resilient means operatively connected to said second stem for biasing the same to its first position; said second resilient means being of sufficient strength so that, when said second stem is in its first position, said second resilient means biases said first stem to its first position against the biasing on said first stem by said first resilient means and any fluid present in said variable chamber; said third resilient means being of sufficient strength to maintain said second stem in its first position against the reaction load of said second resilient means; and manually operable means operatively connected to said second stem for overcoming the biasing effect of said third resilient means and moving said second stem toward its second position and for allowing said resilient means to bias said second stem to its first position; said second stem in moving from its first toward it second position reducing the compression on said second resilient means whereby said first resilient means and the fluid in said variable chamber is operative to bias said first stem toward its second position; the arrangement being such that, with both said stems in their second position, said second movable chamber confluently connects said third and fourth portions prior to said first movable chamber connecting said first and second portions in a confluent relationship and supplying sufficient fluid to said clutch through said first conducting means to urge said piston against said return means an amount sufficient to press said friction means into substantial frictional engagement.

15. A clutch system according to claim 14 wherein said second stem, in addition to blocking one of said third and fourth portions when in its second position, blocks the other of said portions when in its first position and, when in a position intermediate said first and second positions, said second chamber connects said third and fourth portions in a confluent relationship whereby fluid may flow therebetween; the arrangement being such that when said second stem is in its first and second position said first stem is in its first and second position respectively and when said second stem is in its intermediate position said first stem assumes the one of its positions dictated by the biasing force thereon of said first resilient means and the fluid in said variable chamber acting on said first stem in opposition to the load of said second resilient means acting on said first stem.

16. A clutch system comprising in combination a driving shaft; a driven shaft; a hydraulically operated clutch for coupling said shafts in a driving relationship and including a pair of friction means adapted to be pressed into frictional engagement and with each of the same connected in a driving relationship with one of said shafts, piston means for pressing said friction means into frictional engagement and return means for normally urging said piston means to a position wherein the same does not press said friction means into engagement; source means of pressurized fluid; a first conducting means connecting said source means to said clutch for supplying engaging fluid thereto to force said piston means against the urging of said return means into pressing relationship with said friction means; a second conducting means connecting said source means to said clutch for supplying cooling fluid thereto for cooling and lubricating said friction means; a valve means assembly including housing means having a first and a second axially elongated bore therein with each bore having a first and a second end; a first and a second valve stem disposed in said first and second bore respectively and being axially movable relative thereto; each of said stems having a first portion adjacent the first end of the bore receiving the same, a second position displaced axially from said first end and positions intermediate said first and second positions; means including said first bore and said first stem forming a variable chamber between said first stem and said first end of said first bore adapted to vary in volume as said first stem moves axially relative to said first end; means including said second bore and said second stem forming a second variable chamber between said second stem and said first end of said second bore adapted to vary in volume as said second stem moves axially relative to said first end; means forming a first axially movable chamber and including said first stem and said first bore; means forming a second axially movable chamber and including said second stem and said second bore; said first conducting means including first and second portions with said first portion connecting said source means with said first bore and said second portion connecting said first bore with said clutch; the arrangement of said portions and said first chamber being such that, when said first stem is in its first position, said first chamber connects said first and second portions in a confluent relationship; vent means connected to said first bore and being blocked by said first stem when the same is in its first position; the arrangement of said vent means, said portions and said first chamber being such that, when said first stem is in its second position, said first chamber connects said second portion and said vent means in a confluent relationship and said first stem blocks said first portion from said second portion and said vent means and, when said first stem is in a position intermediate said first and second positions, said first chamber is confluent with said second portion and said first stem blocks said first portion and said vent means from said second portion; said second conducting means including third and fourth portions with said third portion connecting said source means to said second bore and said fourth portion connecting said second bore to said clutch; the arrangement of said second chamber and said third and fourth portions being such that, when said second stem is disposed in its first position, the same blocks said third and fourth portions from each other and inhibits the flow of fluid therebetween and, when said second stem moves toward its second position from its first position, said second chamber connects said third and fourth portions in a confluent relationship whereby fluid may flow therebetween; means connecting said first and second variable volume chambers with said first movable chamber for conducting fluid therebetween, which fluid, when entering said variable volume chambers, exerts a force on said stem forming a part of such chamber and urges said stem axially away from the first end of said bore receiving said stem and toward its second position; first resilient means disposed between said first stem and said first bore for urging said first stem toward its second position; second resilient means operatively connected to said first stem for imposing a load thereon urging the same toward its first position; manually operable means for controlling the load imposed by said second resilient means on said first stem so that the position of said first stem is determined by the urging force thereon of said first resilient means and the fluid in said first variable chamber acting on said first stem in opposition to the load of said second resilient means acting on said first stem; third resilient means disposed between said second stem and said second bore for urging said second stem toward its first position whereby the position of said second stem is determined by the biasing force thereon of said third resilient means acting on said second stem in opposition to the fluid in said second variable chamber acting on said second stem; whereby said second stem is in its first position when said first stem is in its second position and said second stem moves toward its second position when said first stem moves sufficiently from its second position to join said first and second portions in a confluent relationship.

17. A clutch system according to claim 16 wherein said second stem, in addition to blocking said third and fourth portions from each other when in its first position, blocks said third and fourth portions from each other when in its second position and, when in a position intermediate said first and second positions, said second chamber connects said third and fourth portions in a confluent relationship whereby fluid may flow therebetween; the arrangement being such that when said second stem is in its first and second positions said first stem is in its first and second positions respectively and, when said second stem is in its intermediate position, said first stem assumes one of its positions dictated by the urging force thereon of said first resilient means and the fluid in said first variable chamber acting on said first stem in opposition to the load of said second resilient means acting on said first stem.

18. A clutch system according to claim 16 wherein said second portion of said first conducting means includes pressure build-up means for building up the pressure in said second portion and in said means connecting said first and second variable chambers with said first movable chamber, which pressure build-up means insures that, when said first chamber is confluent with said first and second portions, the pressure in said second variable chamber becomes sufficient to urge said second stem toward its second position and bring said second movable chamber in a confluent relationship with said third and fourth portions whereupon said pressure build-up valve allows fluid to flow through said second portion to said clutch.

References Cited

UNITED STATES PATENTS 3,155,040  11/1964  Shurts et al. _____ 192—113.2
3,208,570  9/1965  Aschauer _____ 192—113.2

FOREIGN PATENTS 643,196  6/1962  Canada.
1,022,799  3/1966  Great Britain.

FRED C. MATTERN, Jr., *Primary Examiner.*

DAVID J. WILLIAMOWSKY, *Examiner.*

C. J. HUSAR, *Assistant Examiner.*

UNITED STATES PATENT OFFICE
CERTIFICATE OF CORRECTION

Patent No. 3,351,169                                    November 7, 1967

Ronald M. McIndoe

It is hereby certified that error appears in the above numbered patent requiring correction and that the said Letters Patent should read as corrected below.

Column 19, line 65, beginning with "8. The clutch system" strike out all to and including "said first spring" in column 20, line 3 and insert instead the following:

> 8. The clutch system of claim 7 wherein said resilient means biasing said second valve means includes a first and a second spring, said first spring constantly biasing said second valve to its first position, said second spring being preloaded and engaging said vlave means upon the same reaching its intermediate position and imposing a biasing load thereon as the same moves from its intermediate to its second position whereby said second spring acts as a resilient stop for maintaining said second valve means in its intermediate position until said portion of said fluid flowing to said second valve means reaches a much higher pressure than was necessary to bias said second valve means from its first to its intermediate position against the load of said first spring.

column 21, line 1, beginning with "11. A clutching system" strike out all to and including "thereon." in line 15, same column 21, and insert instead the following:

> 11. A clutching system according to claim 10 wherein said second valve means blocks the flow of fluid in said second conducting means when in its first and second position and includes a position intermediate said first and second positions wherein it allows fluid to flow in said second conducting means, said second valve means moving through said intermediate position upon movement thereof from its first to its second and from its second to its first positions, said first valve means being in its first and second position respectively, and when said second valve means is in its intermediate position said first valve means is in the one of its positions dictated by the resultant force of said resilient means and said portion of said fluid acting thereon.

Signed and sealed this 19th day of November 1968.

(SEAL)
Attest:

EDWARD M. FLETCHER, JR.
Attesting Officer

EDWARD J. BRENNER
Commissioner of Patents